US012218555B2

(12) United States Patent
Kang

(10) Patent No.: US 12,218,555 B2
(45) Date of Patent: Feb. 4, 2025

(54) DUAL AND MULTIPLE AIR GAP ROTARY DEVICE

(71) Applicant: VAM CO., LTD., Changwon-si (KR)

(72) Inventor: Dohyun Kang, Changwon-si (KR)

(73) Assignee: VAM CO., LTD., Changwon-si (KR)

( * ) Notice: Subject to any disclaimer, the term of this patent is extended or adjusted under 35 U.S.C. 154(b) by 280 days.

(21) Appl. No.: 17/786,716

(22) PCT Filed: Oct. 15, 2020

(86) PCT No.: PCT/KR2020/014069
§ 371 (c)(1),
(2) Date: Jun. 17, 2022

(87) PCT Pub. No.: WO2021/125526
PCT Pub. Date: Jun. 24, 2021

(65) Prior Publication Data
US 2023/0018260 A1   Jan. 19, 2023

(30) Foreign Application Priority Data

Dec. 20, 2019 (KR) .................. 10-2019-0171946
Sep. 17, 2020 (KR) .................. 10-2020-0119641

(51) Int. Cl.
*H02K 16/04* (2006.01)
*H02K 5/20* (2006.01)
(Continued)

(52) U.S. Cl.
CPC ............ *H02K 16/04* (2013.01); *H02K 5/207* (2021.01); *H02K 9/06* (2013.01); *H02K 11/33* (2016.01); *H02K 2201/03* (2013.01)

(58) Field of Classification Search
CPC .......... H02K 16/04; H02K 5/207; H02K 9/06; H02K 11/33; H02K 2201/03; H02K 1/276;
(Continued)

(56) References Cited

U.S. PATENT DOCUMENTS

2004/0174084 A1* 9/2004 Tajima ................. H02K 19/103
310/156.53
2013/0093275 A1* 4/2013 Kim ....................... H02K 1/278
310/114
(Continued)

FOREIGN PATENT DOCUMENTS

JP      2007166764 A    6/2007
KR      101131743 B1    4/2012
(Continued)

OTHER PUBLICATIONS

CN 108832785; Wang et al. (Year: 2018).*

*Primary Examiner* — Ahmed Elnakib
(74) *Attorney, Agent, or Firm* — Rabin & Berdo, P.C.

(57) ABSTRACT

The present invention relates to rotary devices, such as an electric motors and power generators, having dual and multiple air gaps. Disclosed is a rotary device characterized by comprising a rotor part, a stator part, an inner support part, and a housing part. The inner support part is coupled and fixed to the housing part. The stator part includes: an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core. The rotor part includes: a rotor-side magnetic force application part which has, on the inner circumferential side, the inner stator part and an inner air gap, and has, on the outer circumferential side, the (Continued)

outer stator part and an outer air gap; and a pair of end support parts installed at respective ends of the rotor-side magnetic force application part. At least one among the pair of end support parts is coupled and fixed to a rotary shaft which is rotatably installed in the housing part.

20 Claims, 35 Drawing Sheets

(51) Int. Cl.
*H02K 9/06* (2006.01)
*H02K 11/33* (2016.01)

(58) Field of Classification Search
CPC ...... H02K 1/2789; H02K 5/161; H02K 21/14; H02K 21/22; H02K 1/2753; H02K 1/20; H02K 1/2792; H02K 1/28; H02K 5/20; H02K 7/083; H02K 9/04; H02K 9/16; H02K 2205/09; H02K 7/003; Y02T 10/64; H02P 27/06
USPC .................................. 310/62, 112, 113, 114
See application file for complete search history.

(56) References Cited

U.S. PATENT DOCUMENTS

| | | | |
|---|---|---|---|
| 2016/0294229 A1* | 10/2016 | Volkmuth | ................ F03D 9/25 |
| 2020/0303973 A1* | 9/2020 | Kang | .................... H02K 16/04 |

FOREIGN PATENT DOCUMENTS

| | | | |
|---|---|---|---|
| KR | 1020150009891 A | | 1/2015 |
| KR | 1020190036890 A | | 4/2019 |
| WO | WO2019066487 | * | 4/2019 |

* cited by examiner

[FIG. 1]
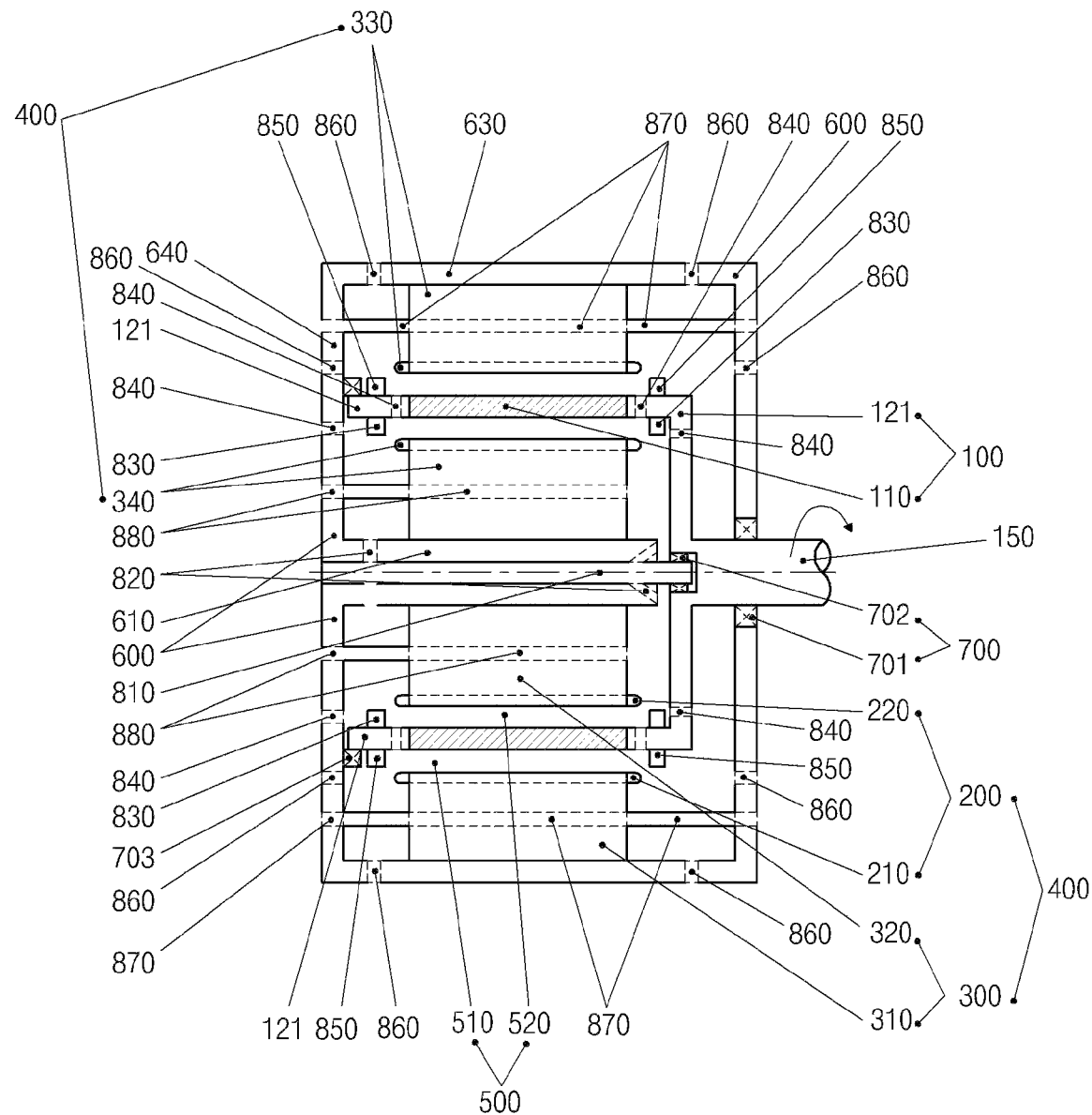

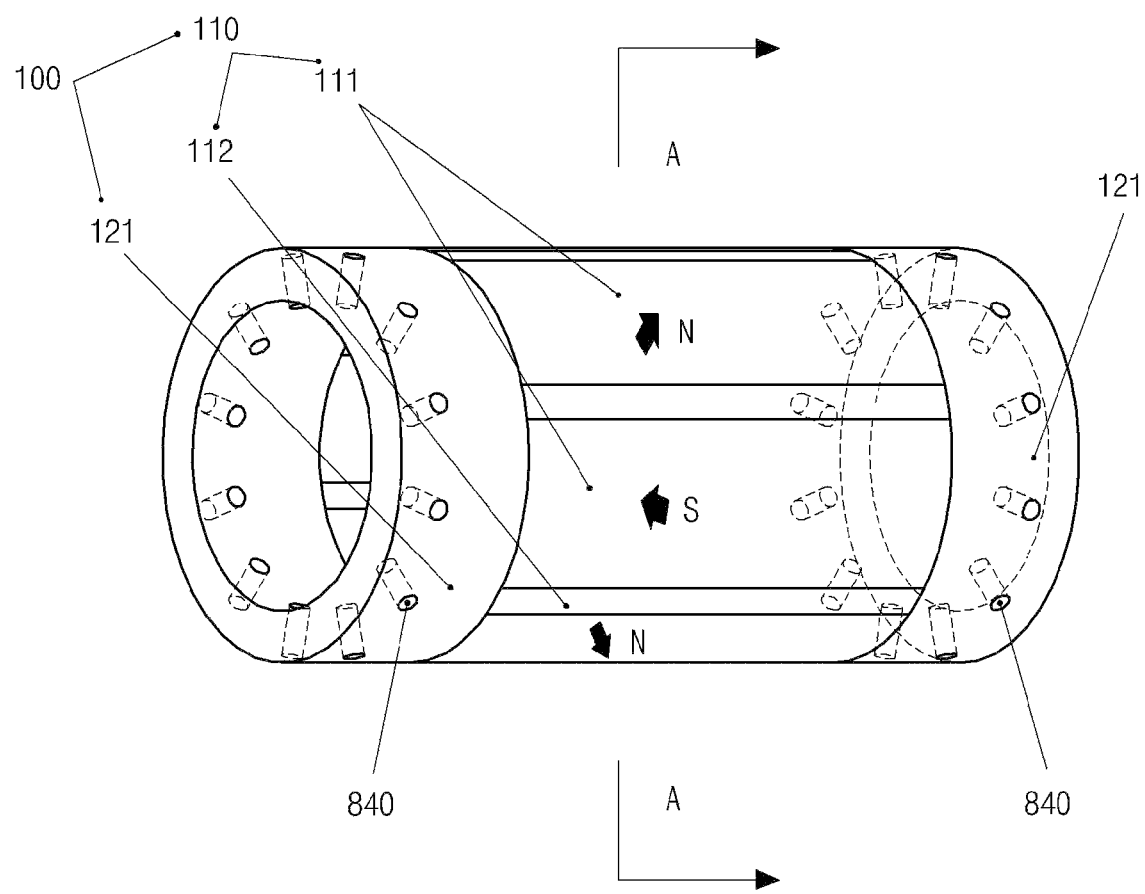
[FIG. 2]

[FIG. 3]
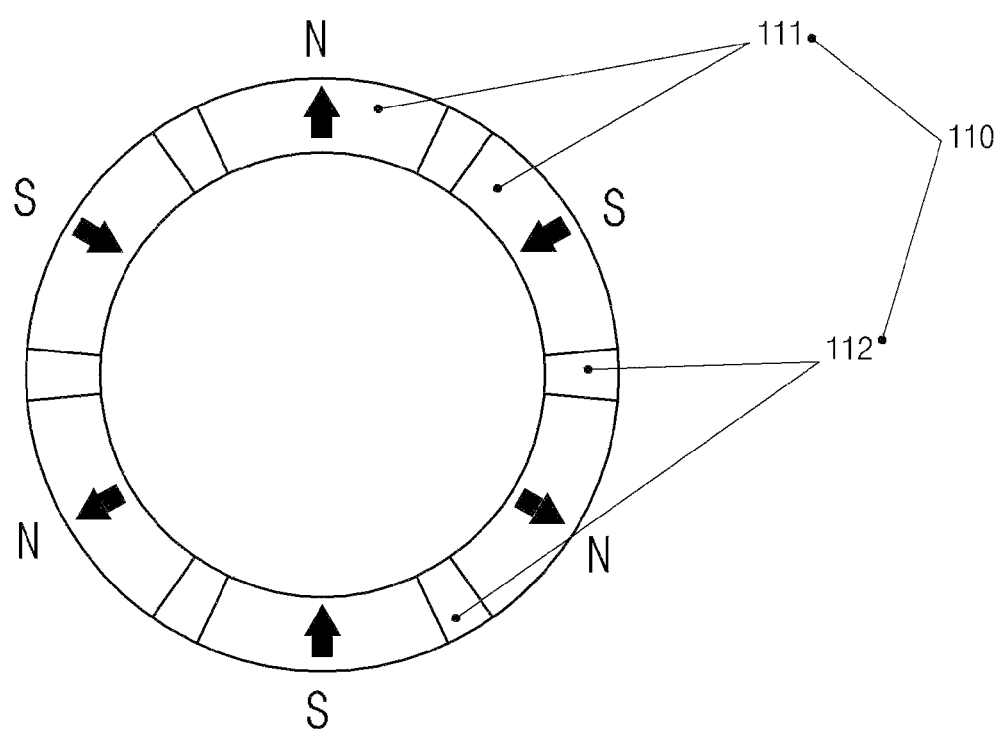

[FIG. 4]
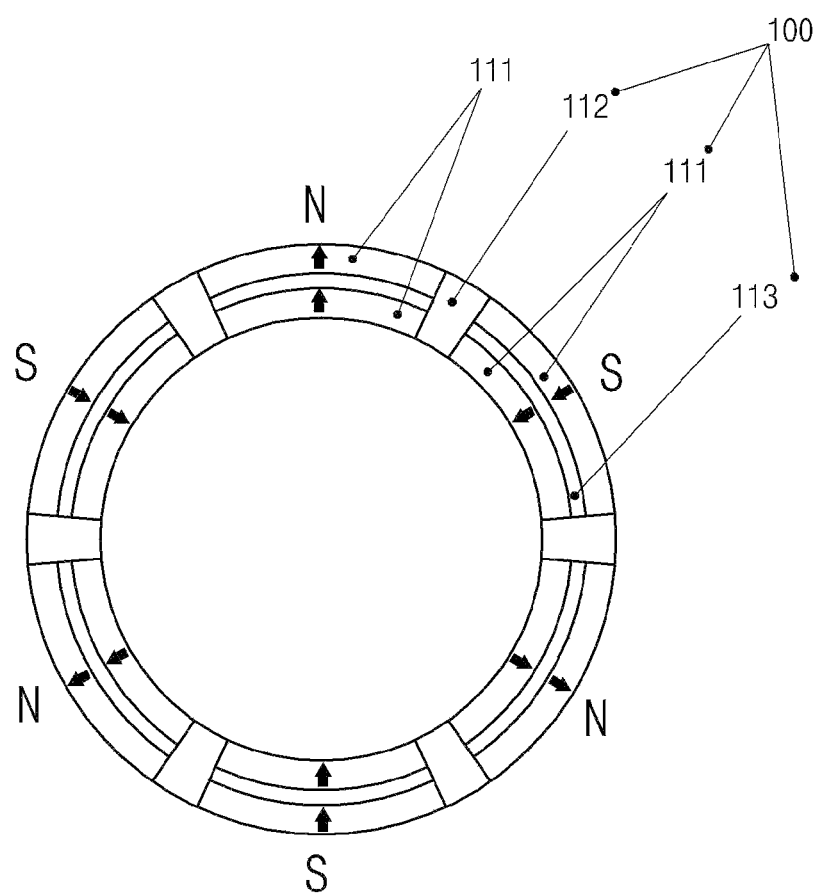

[FIG. 5]
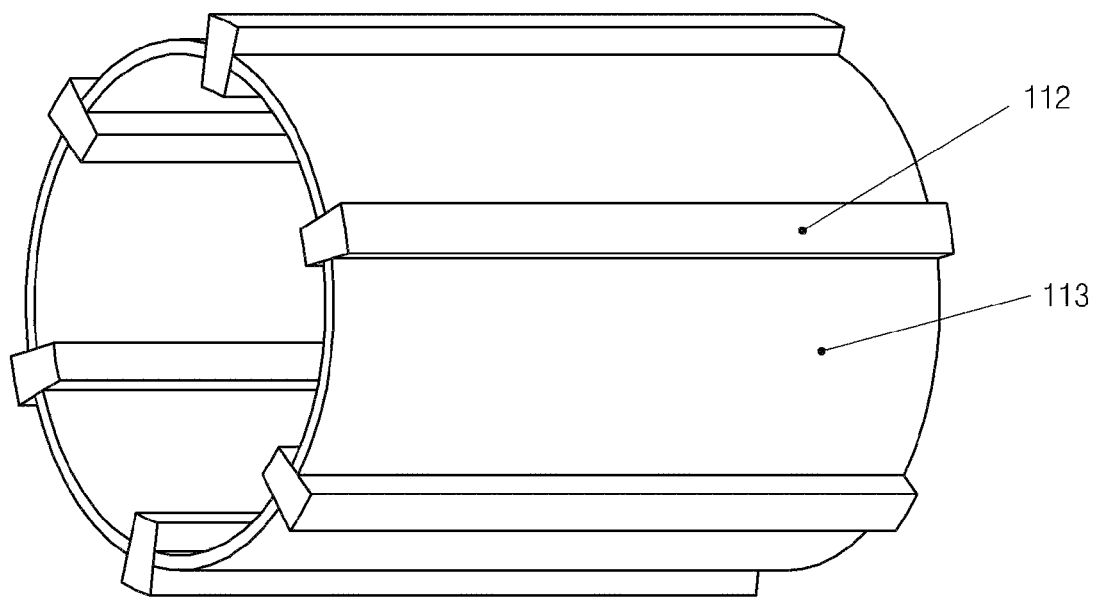

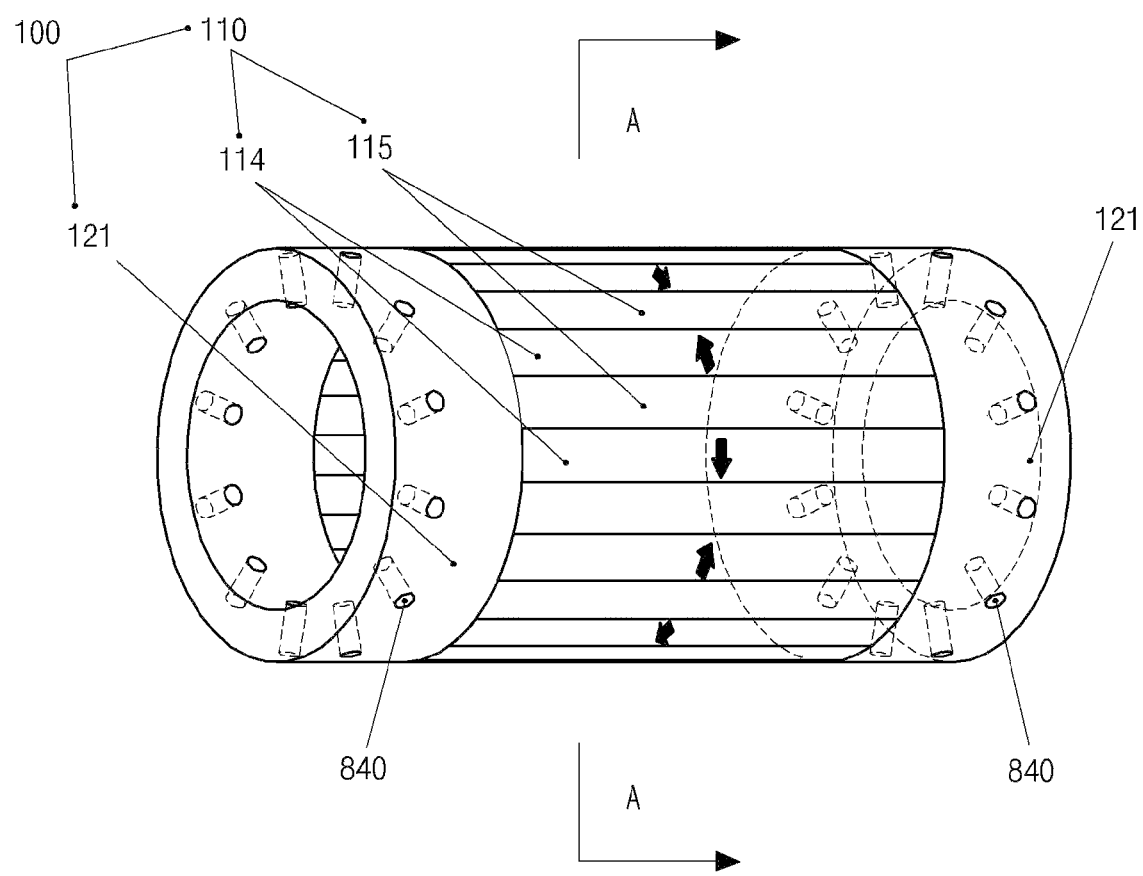
[FIG. 6]

[FIG. 7]
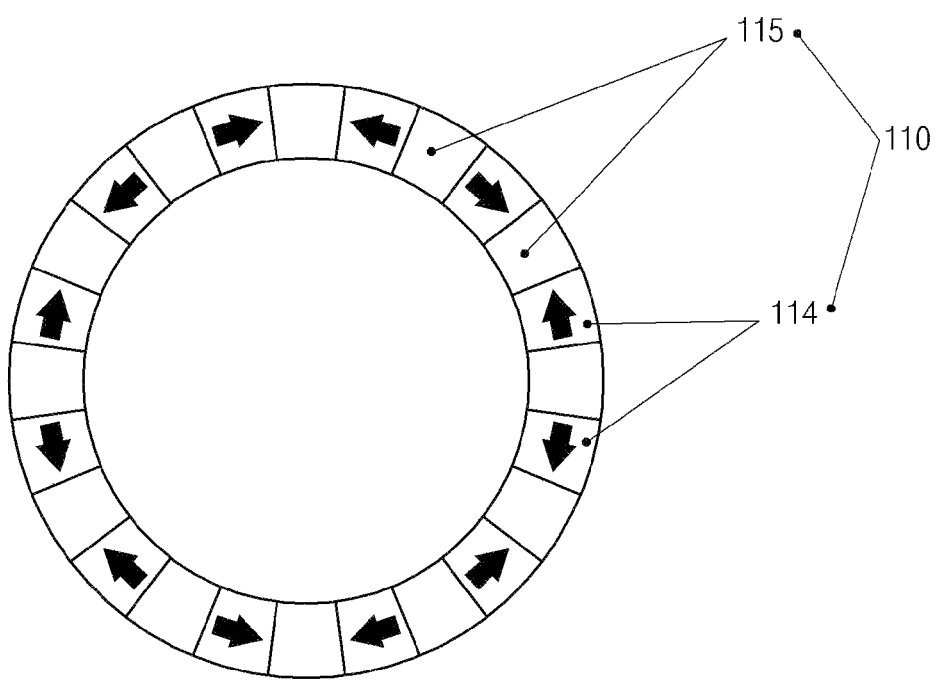

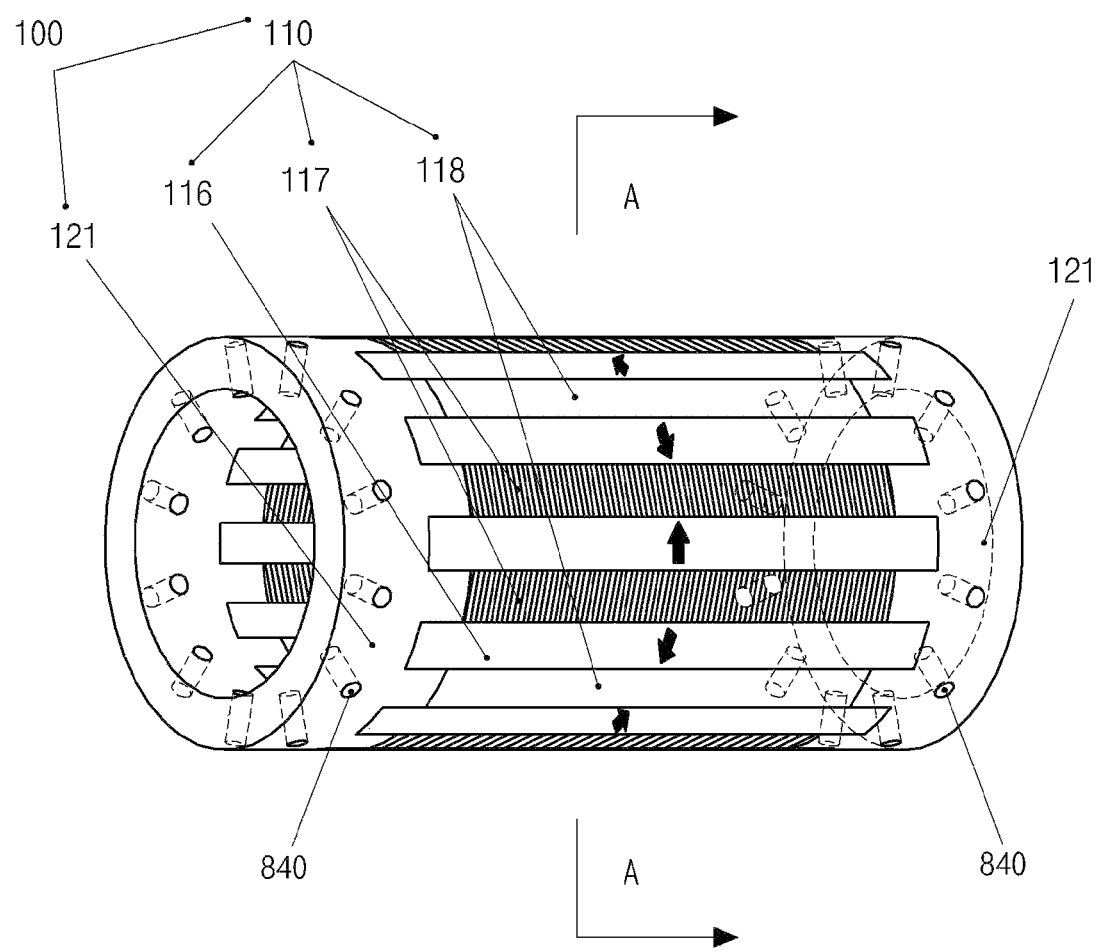

[FIG. 9]
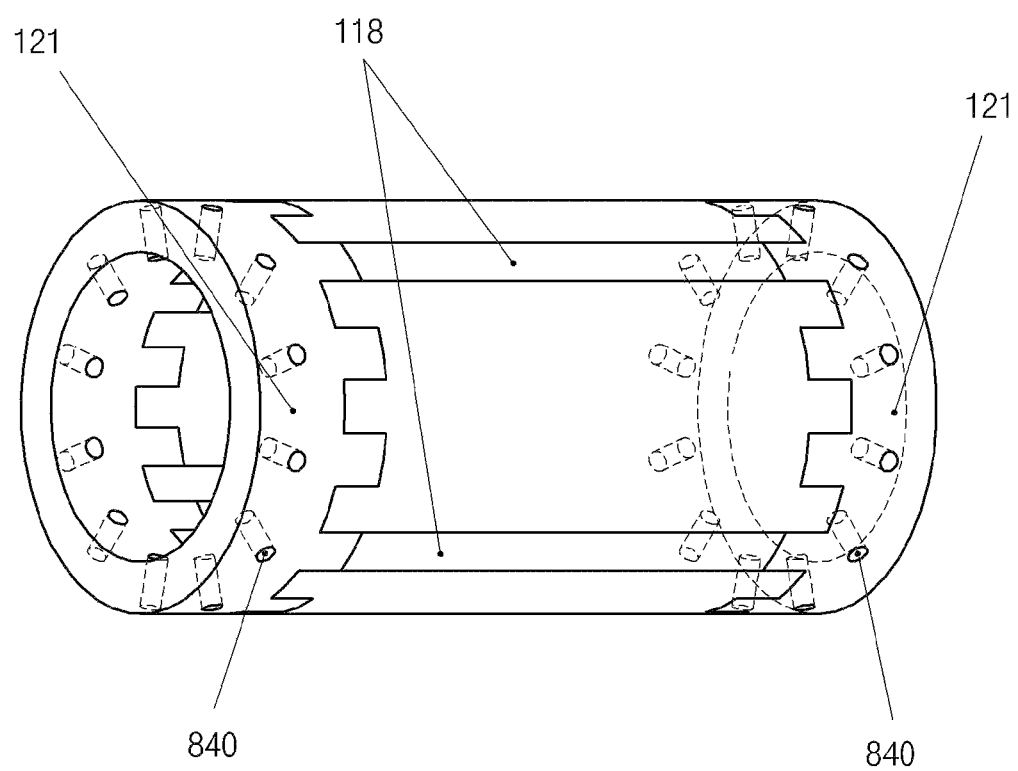

[FIG. 10]
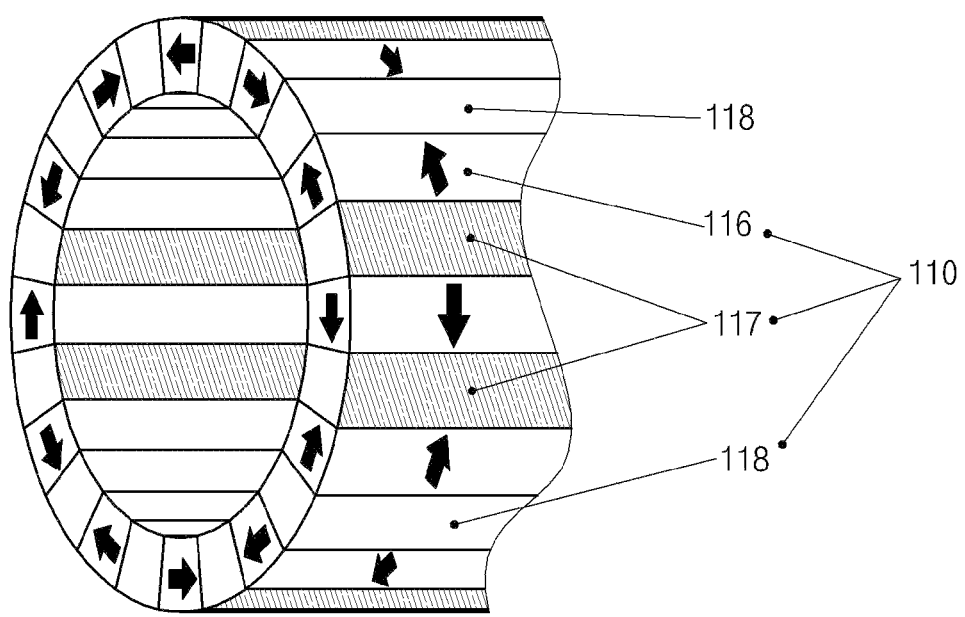

[FIG. 11]
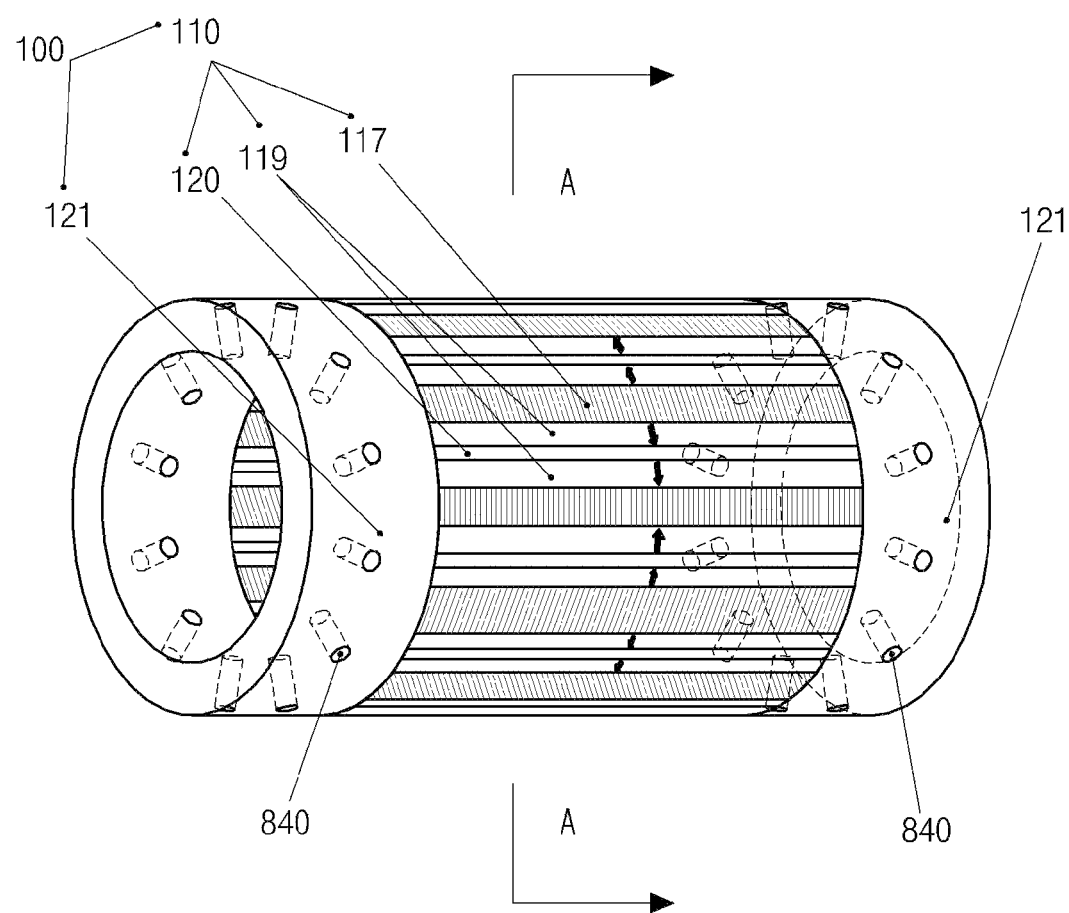

【FIG. 12】
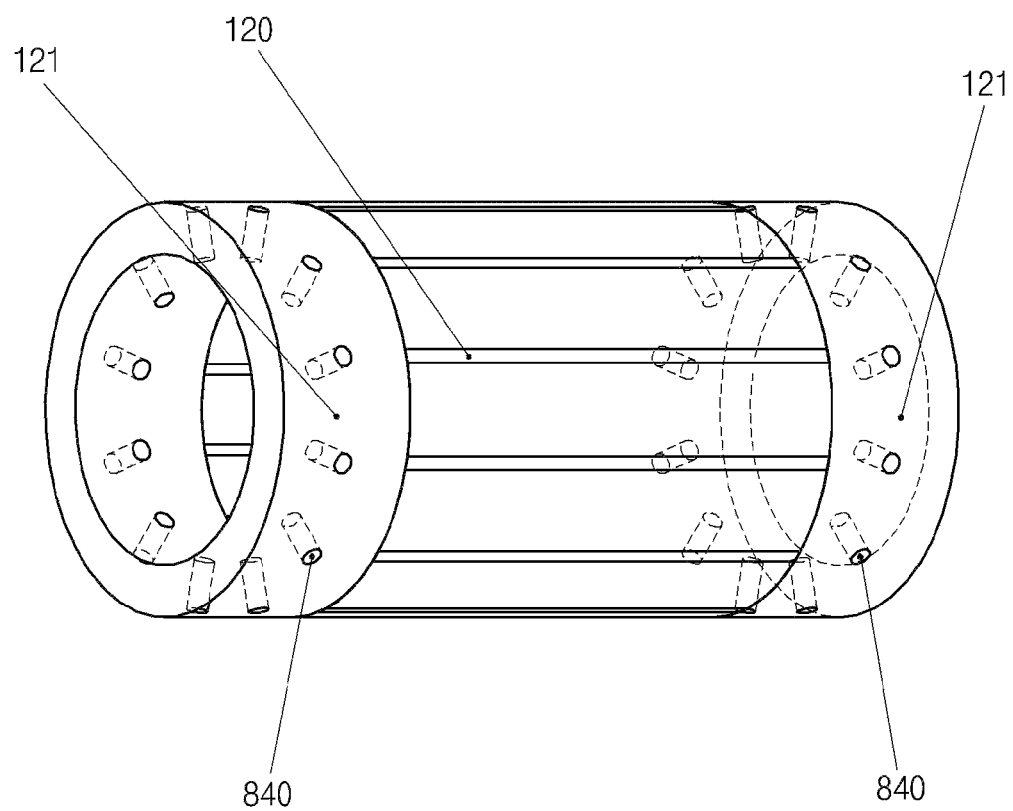

[FIG. 13]
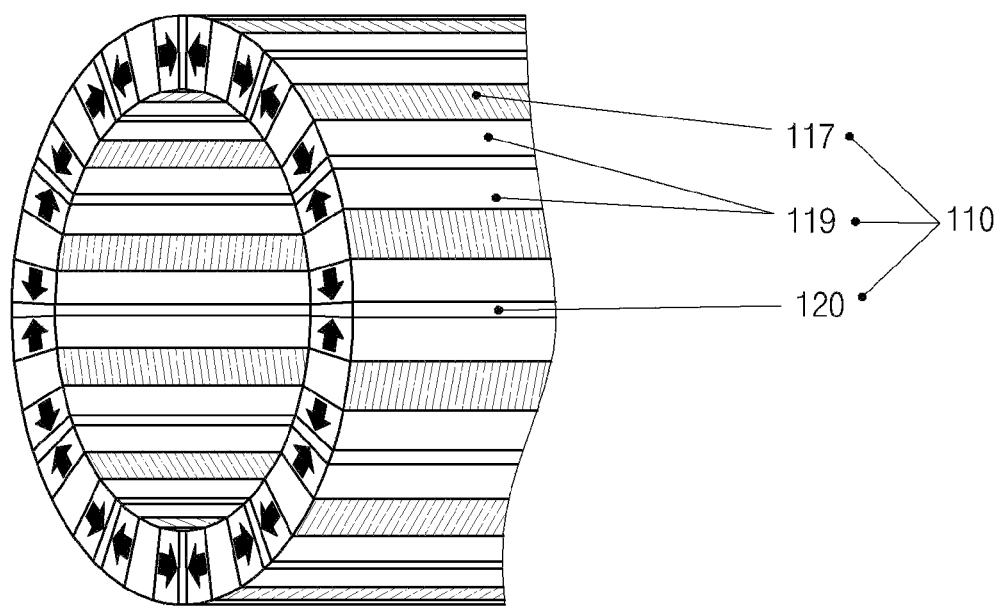

[FIG. 14]
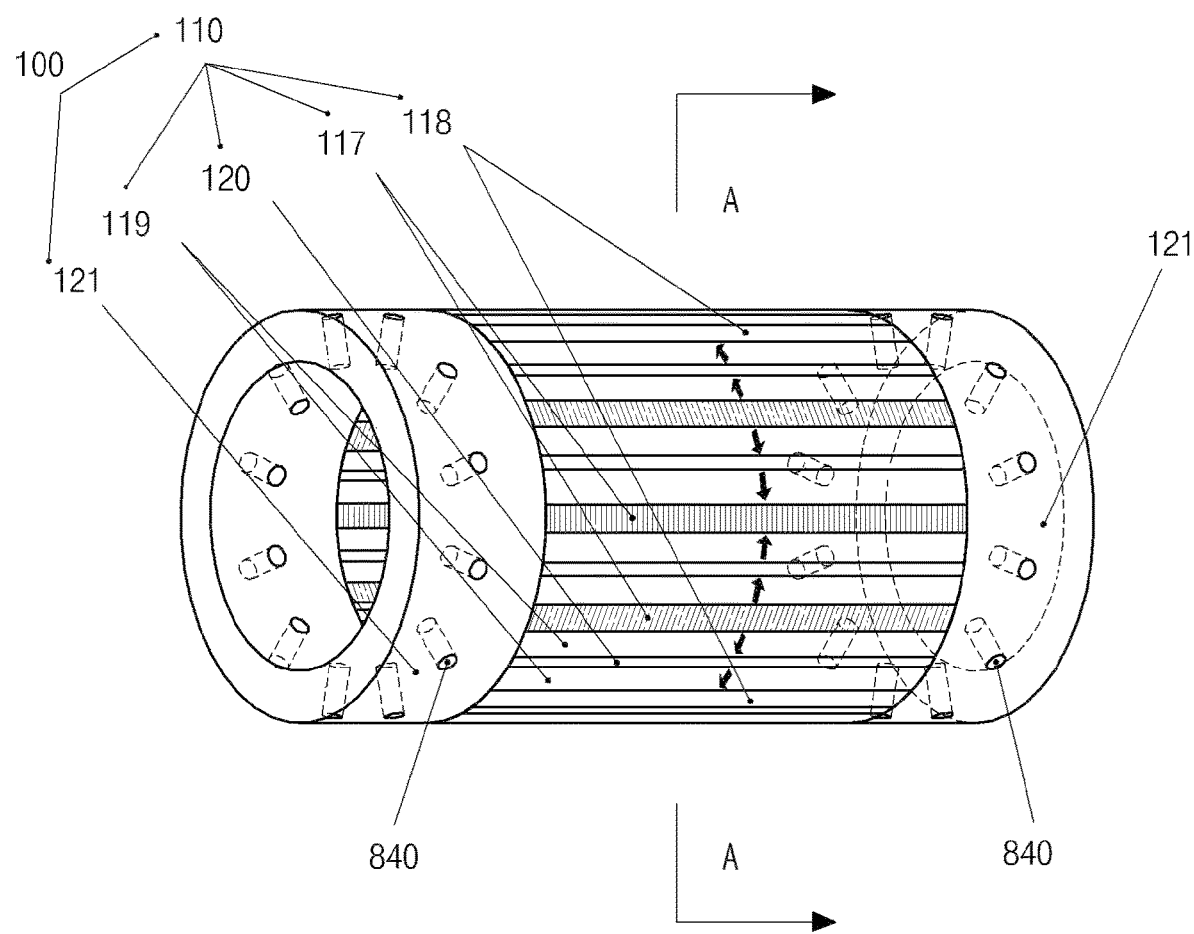

[FIG. 15]
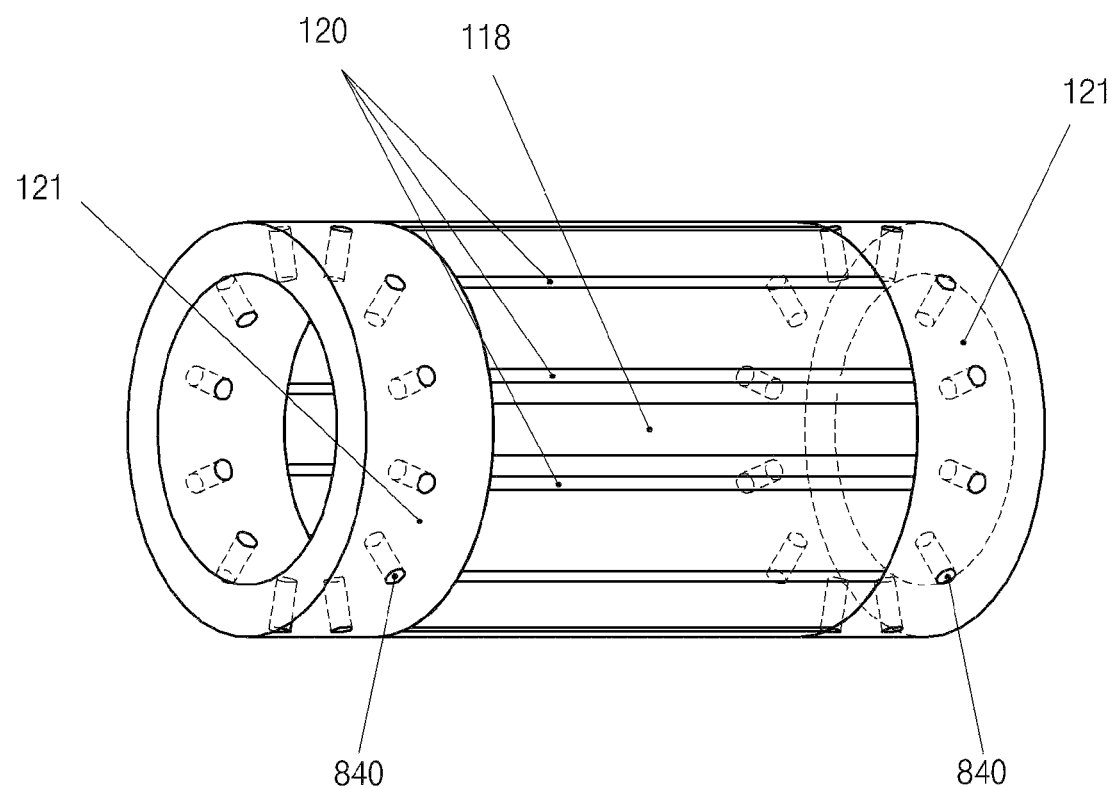

[FIG. 16]
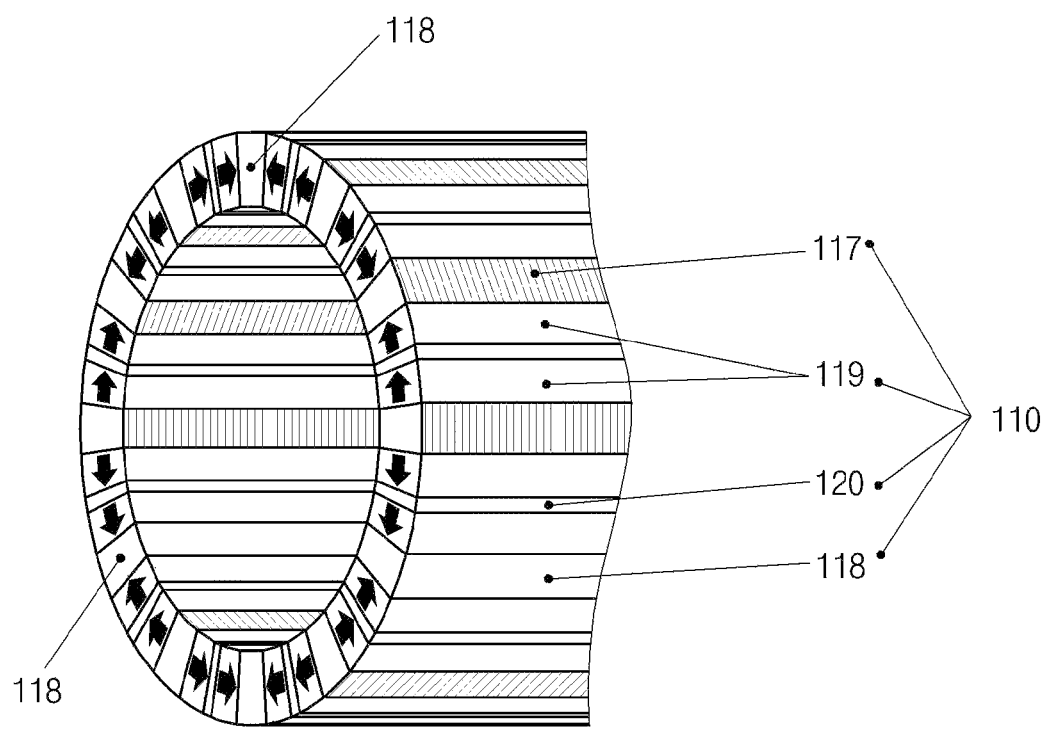

[FIG. 17]
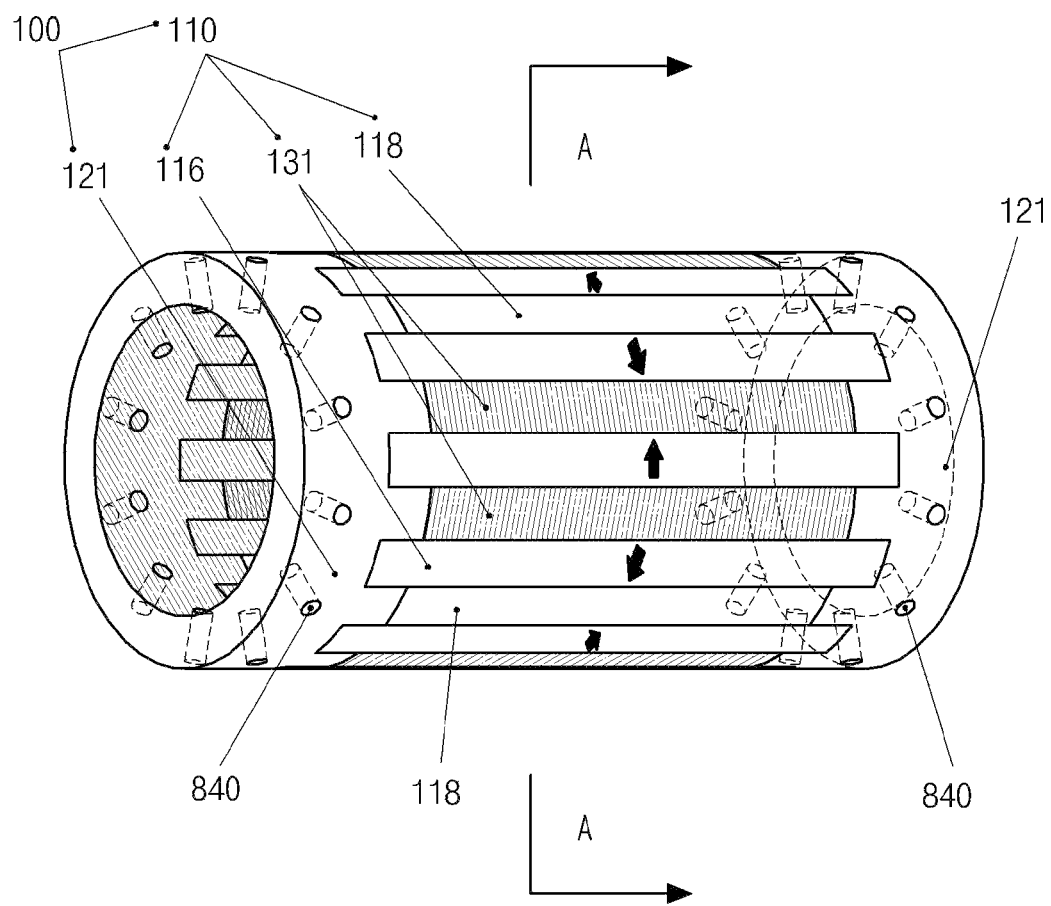

[FIG. 18]
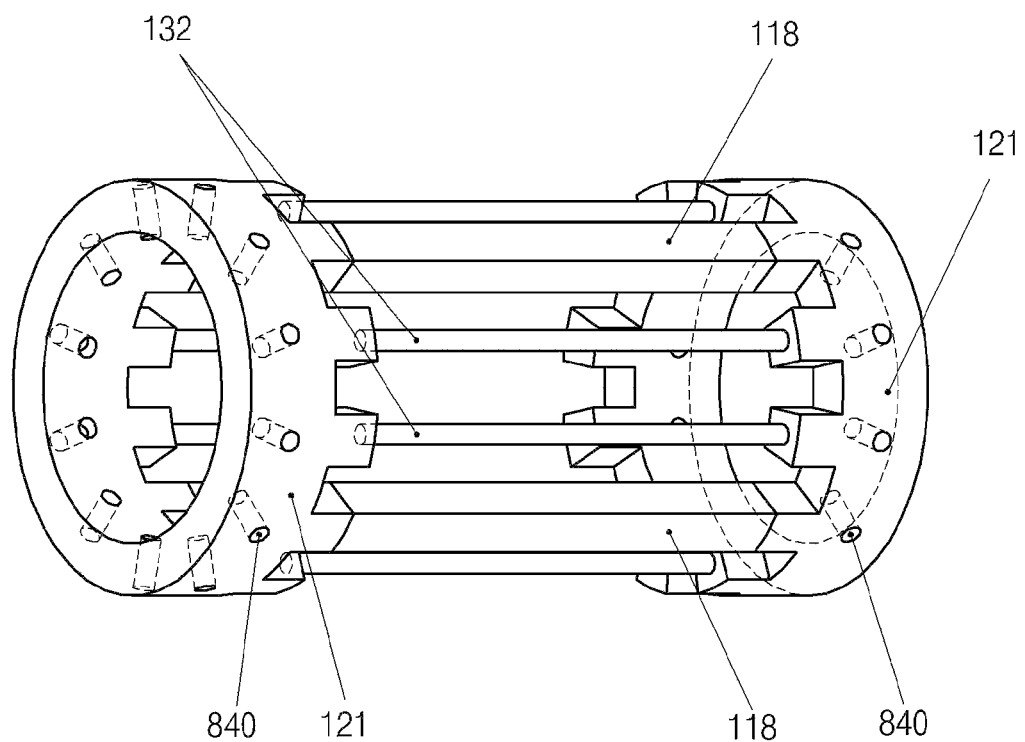

[FIG. 19]
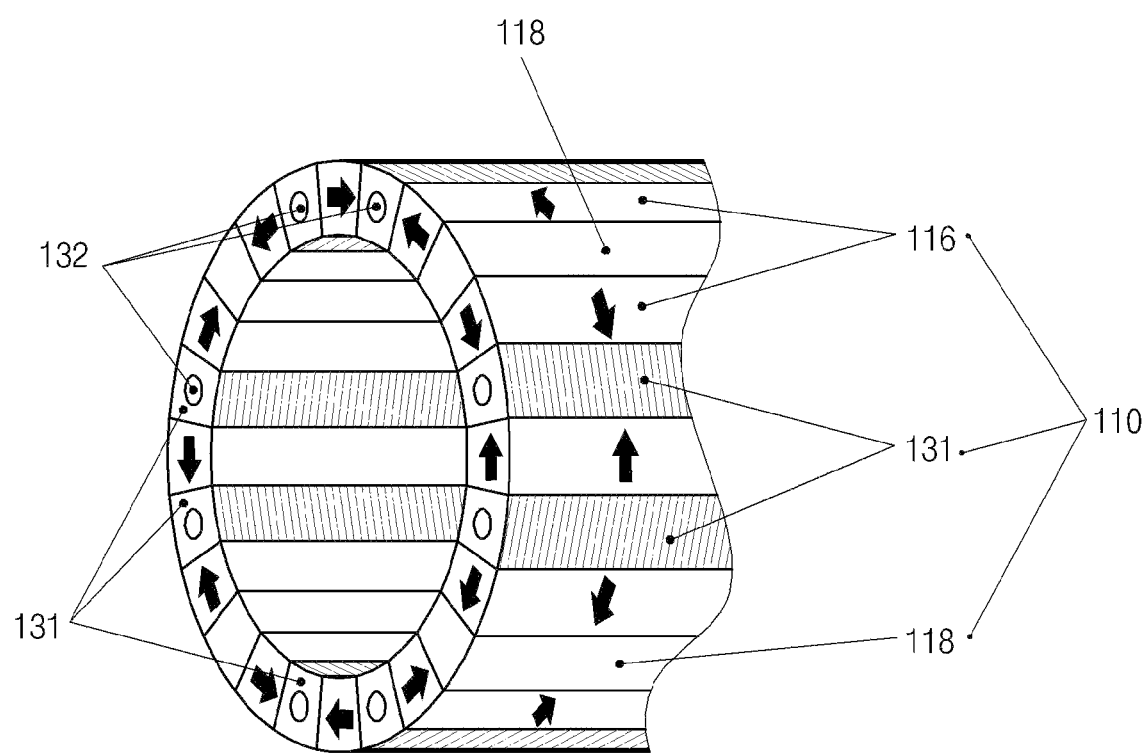

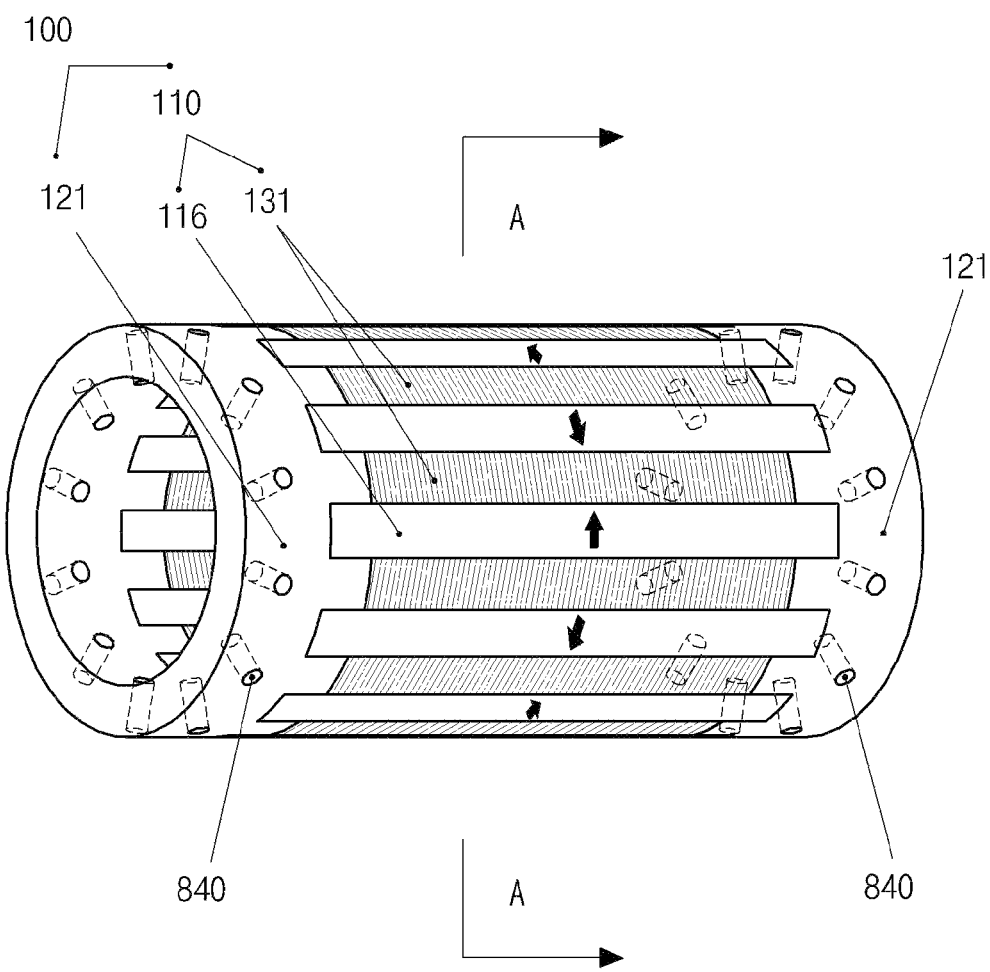
[FIG. 20]

[FIG. 21]
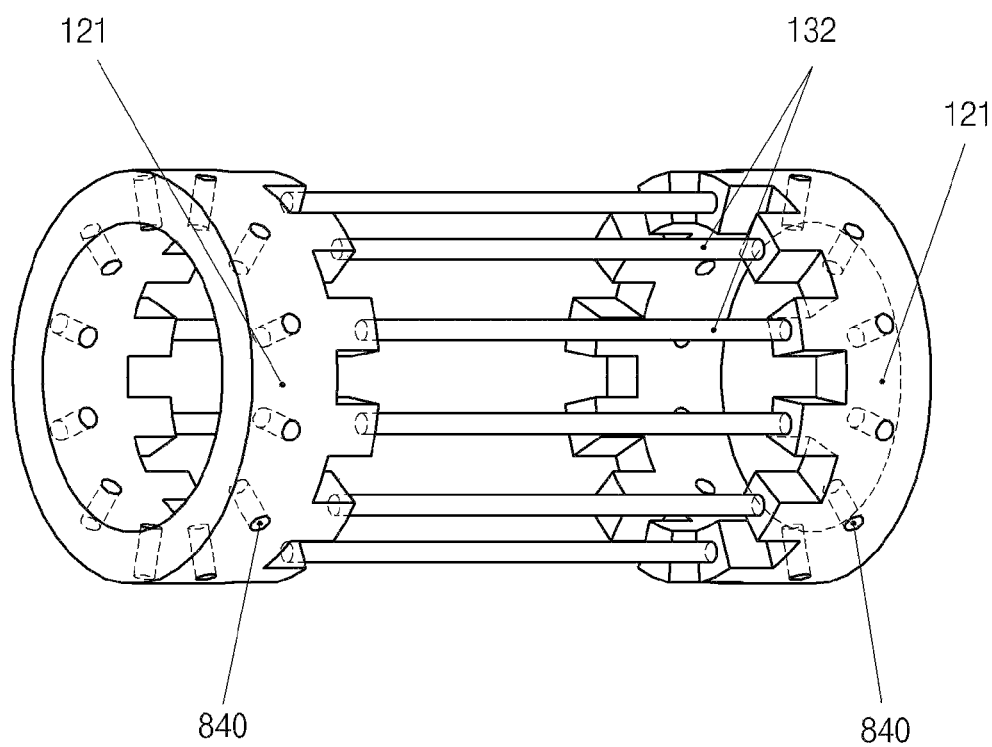

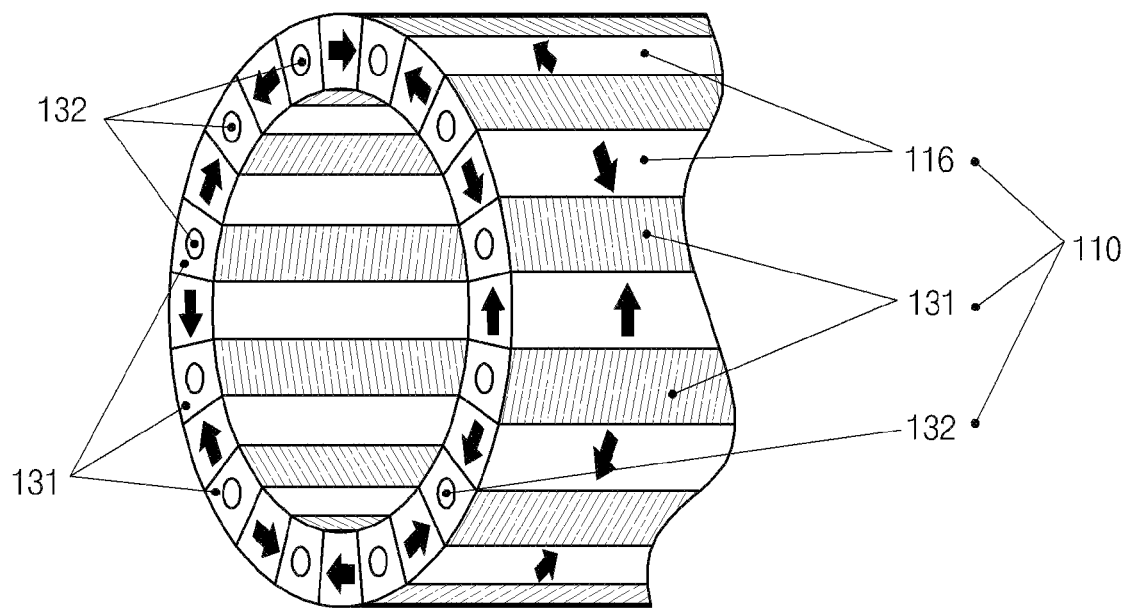
[FIG. 22a]

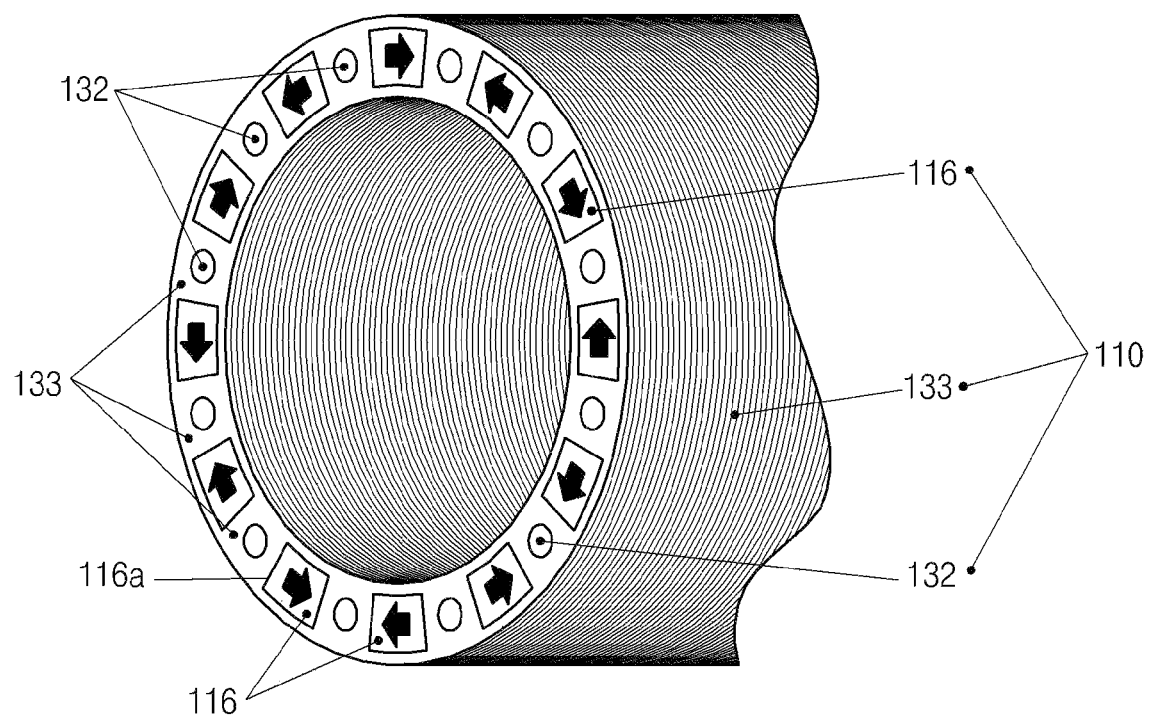
[FIG. 22b]

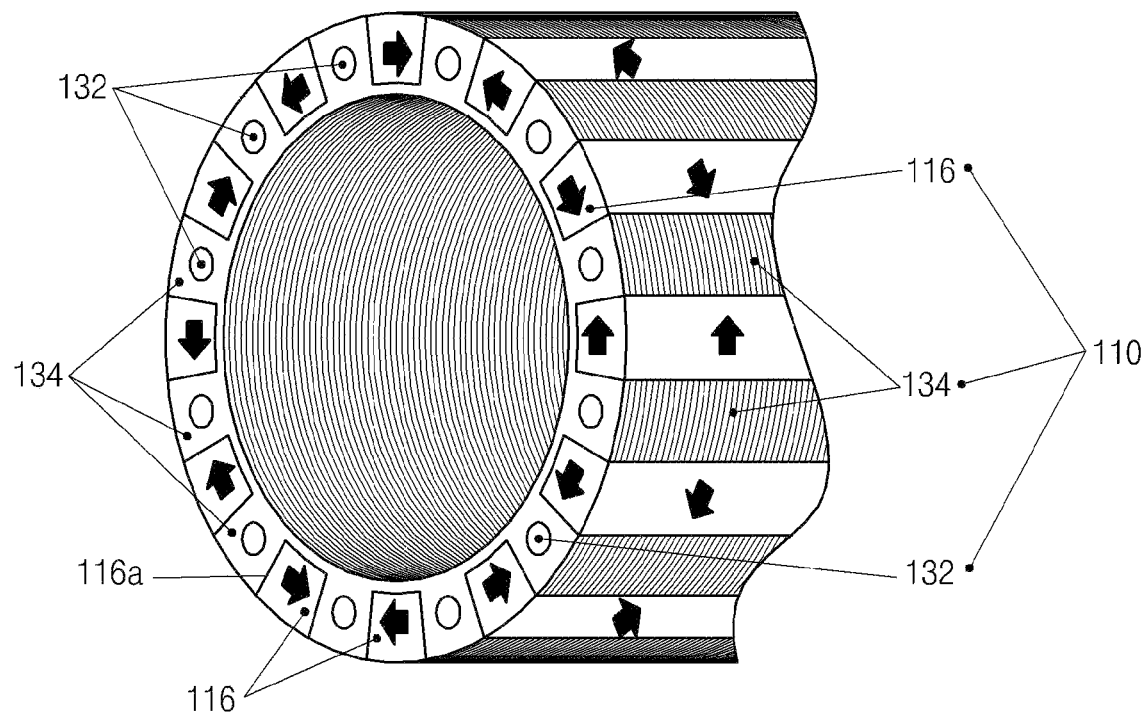
[FIG. 22c]

[FIG. 22d]
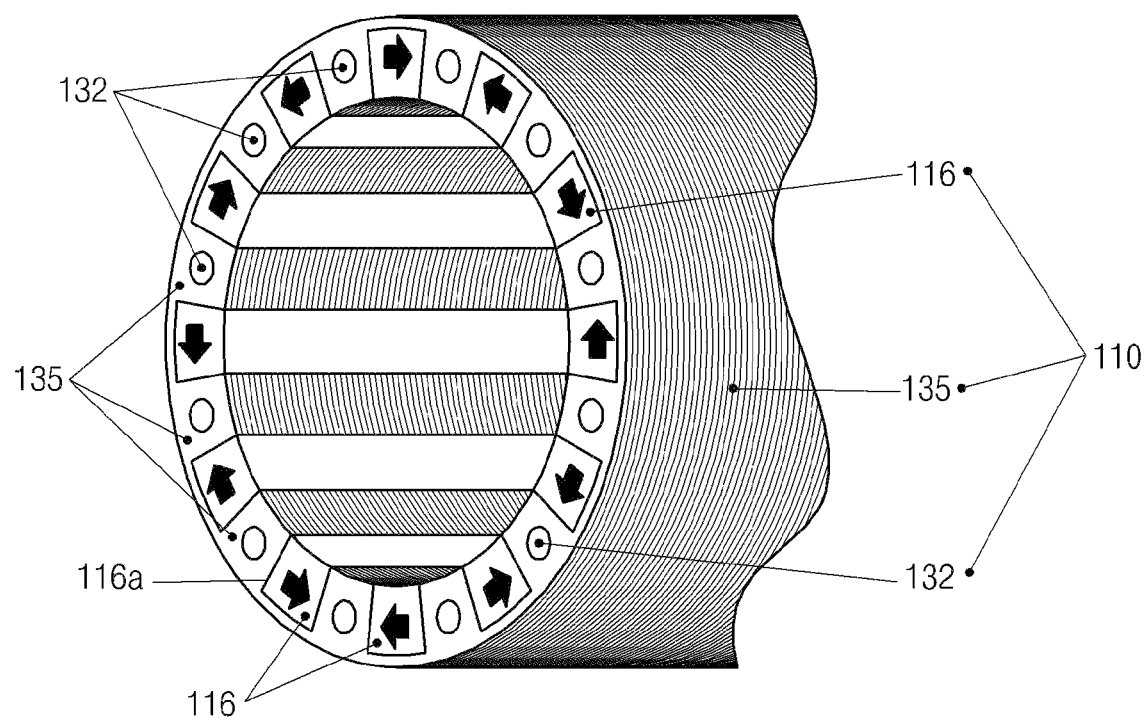

[FIG. 23]
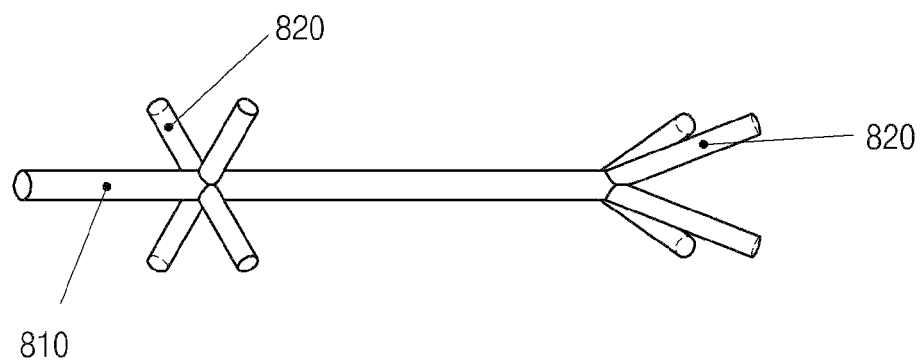
[FIG. 24]
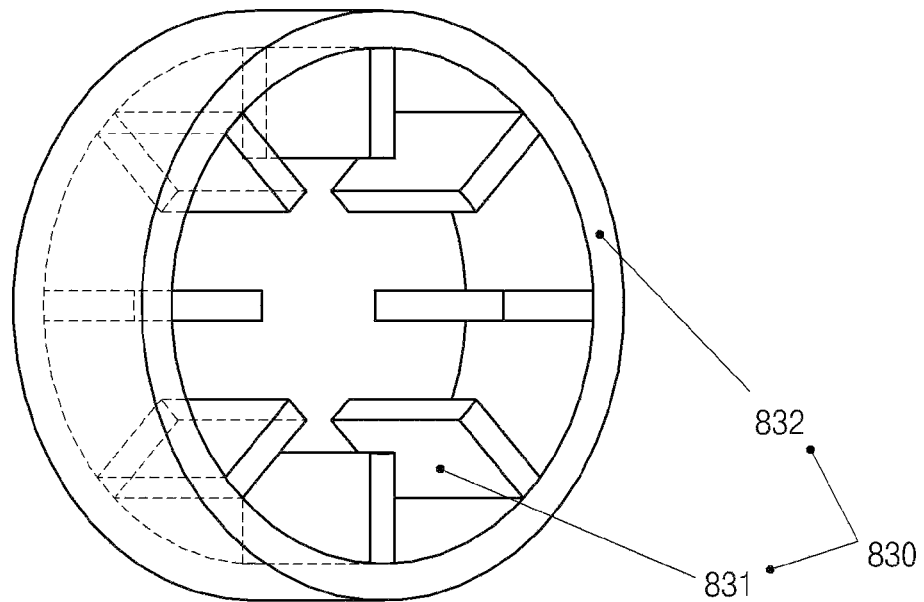

[FIG. 25]
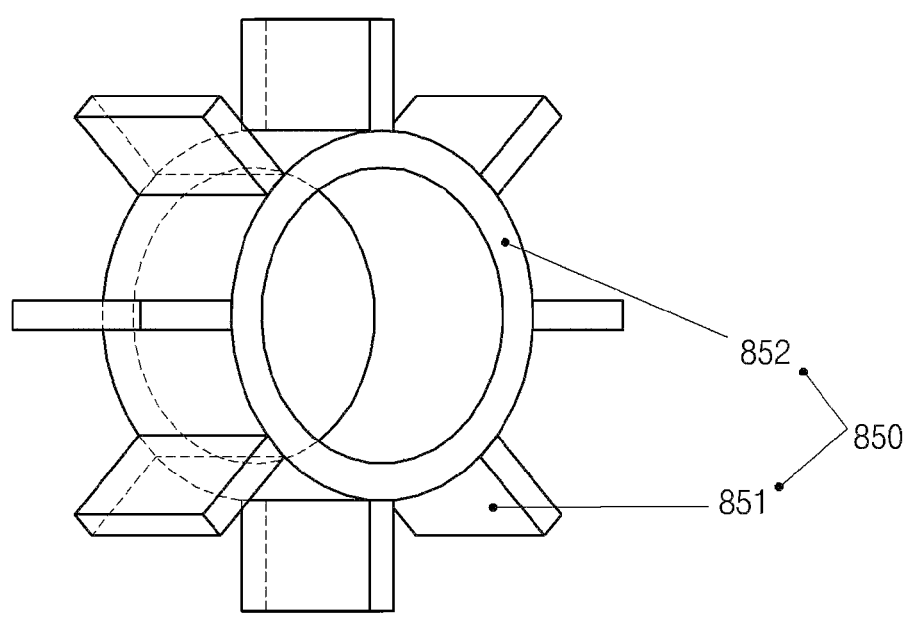

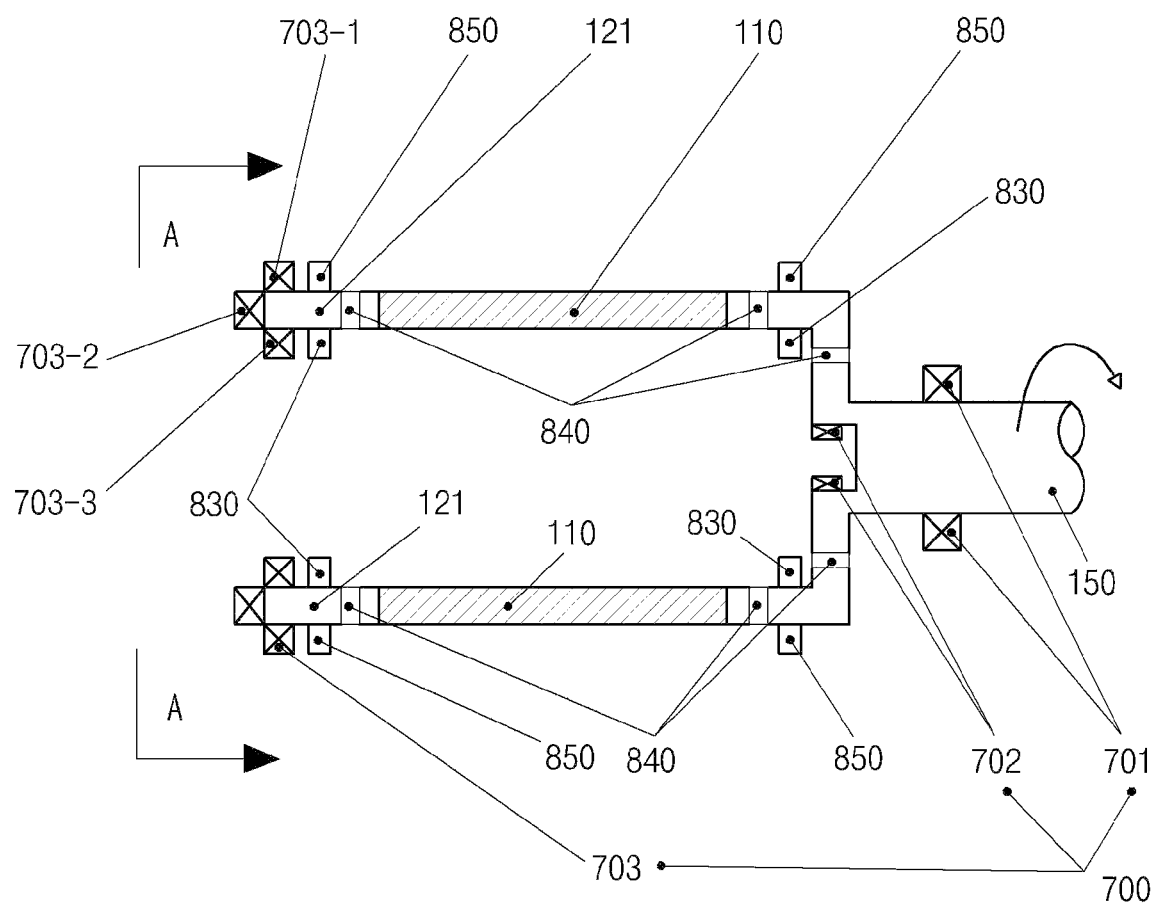
[FIG. 26]

[FIG. 27]
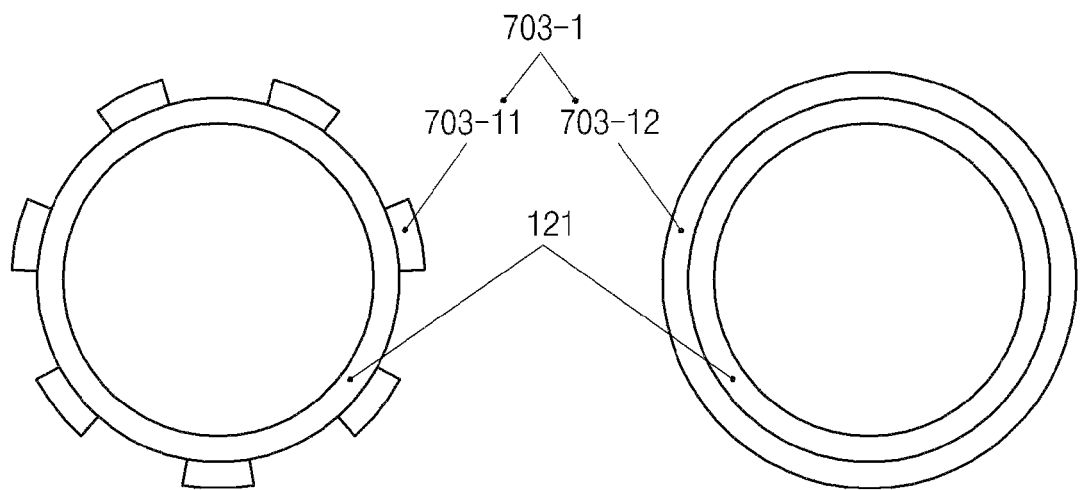
[FIG. 28]
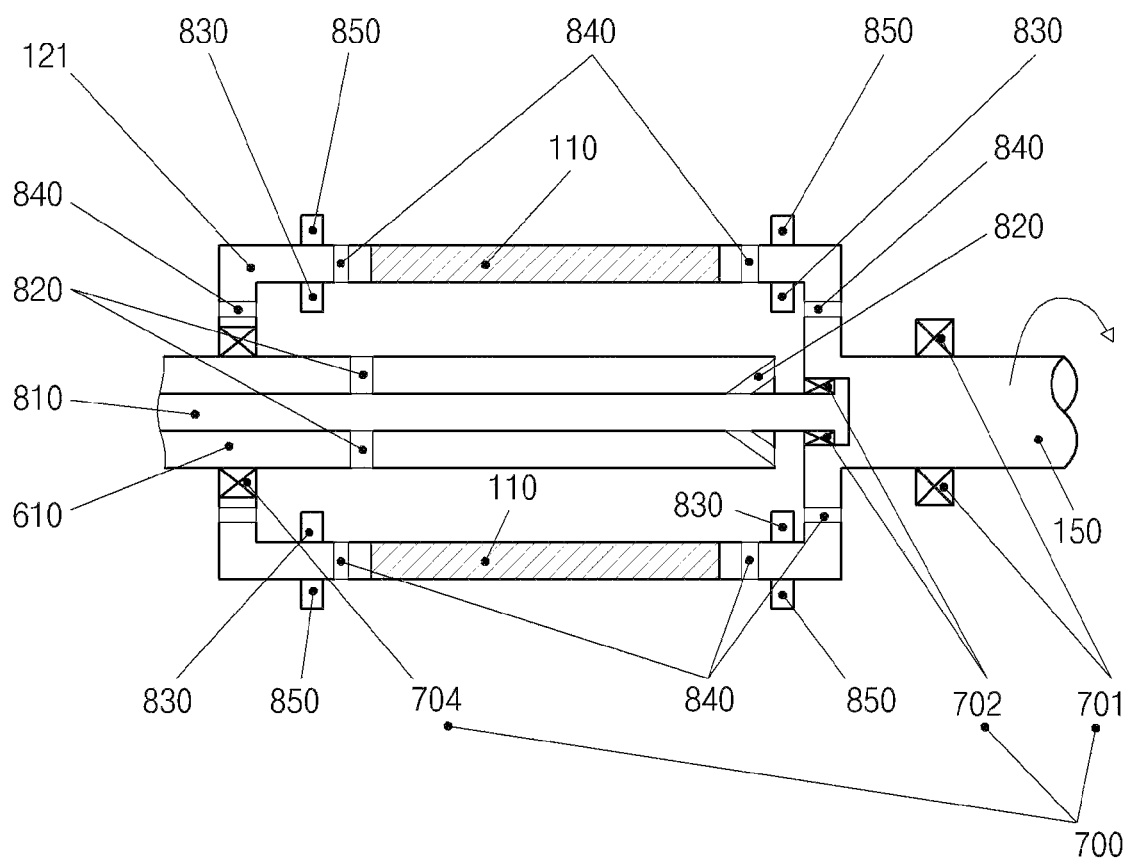

[FIG. 29]
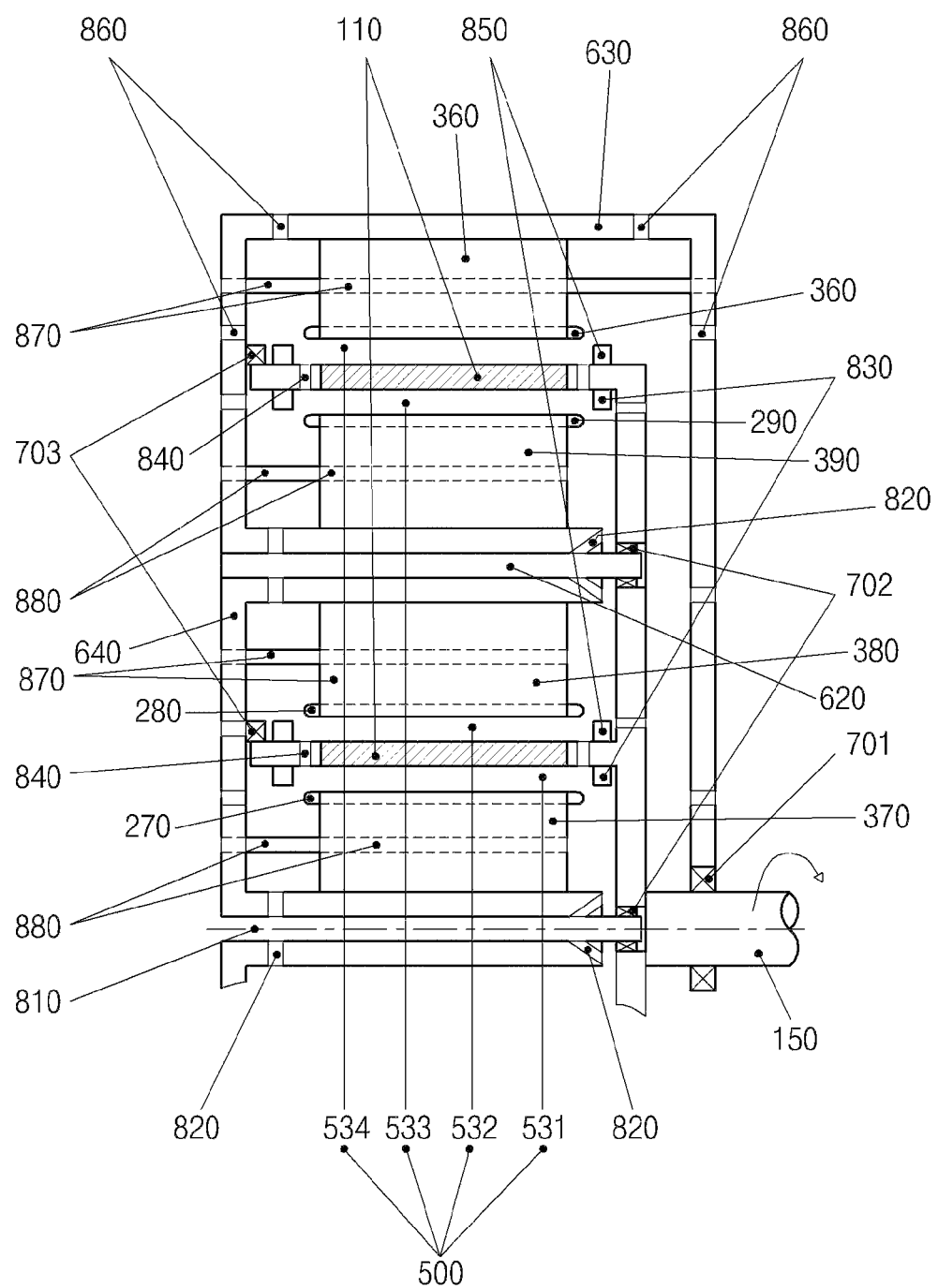

[FIG. 30]
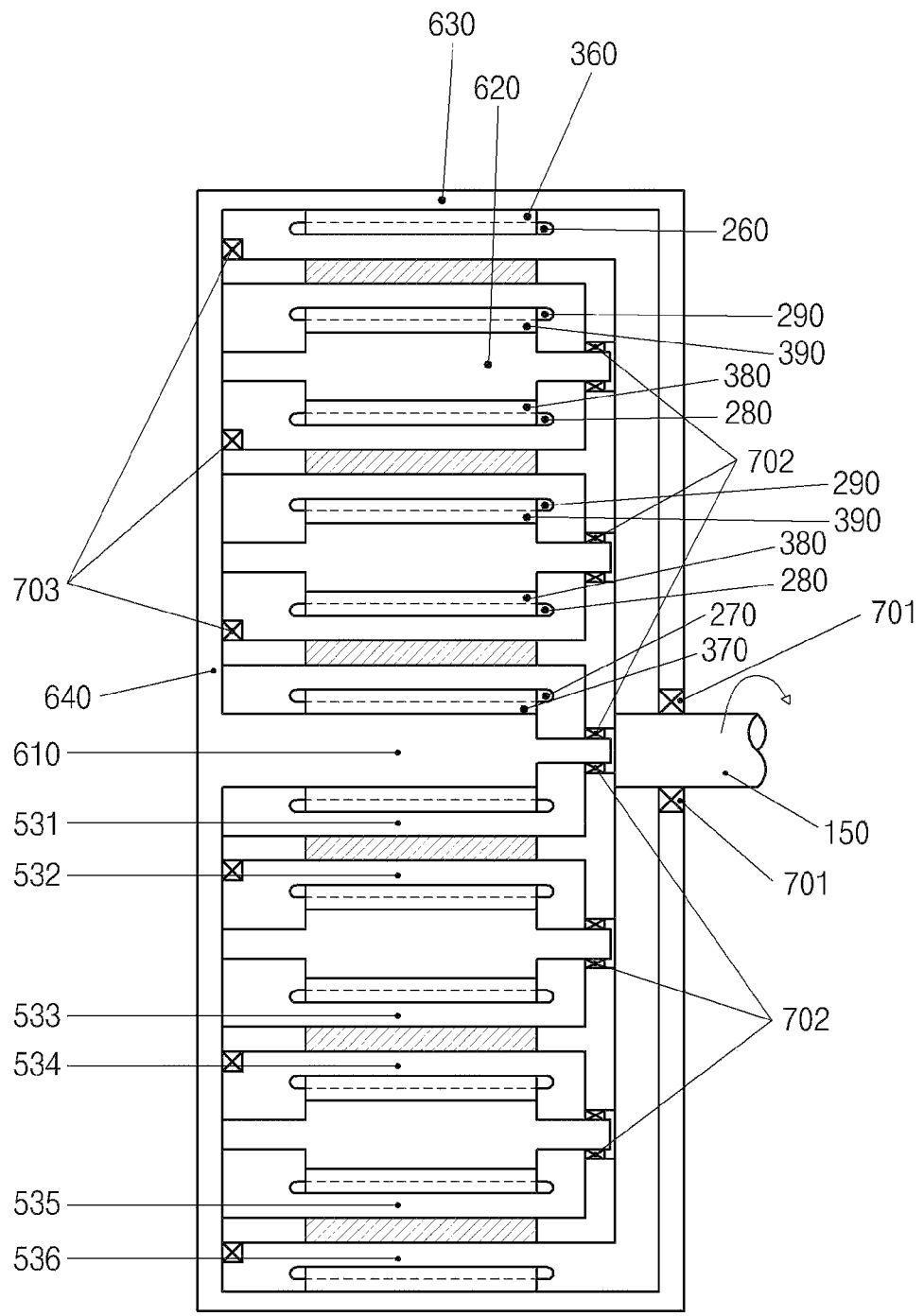

[FIG. 31]
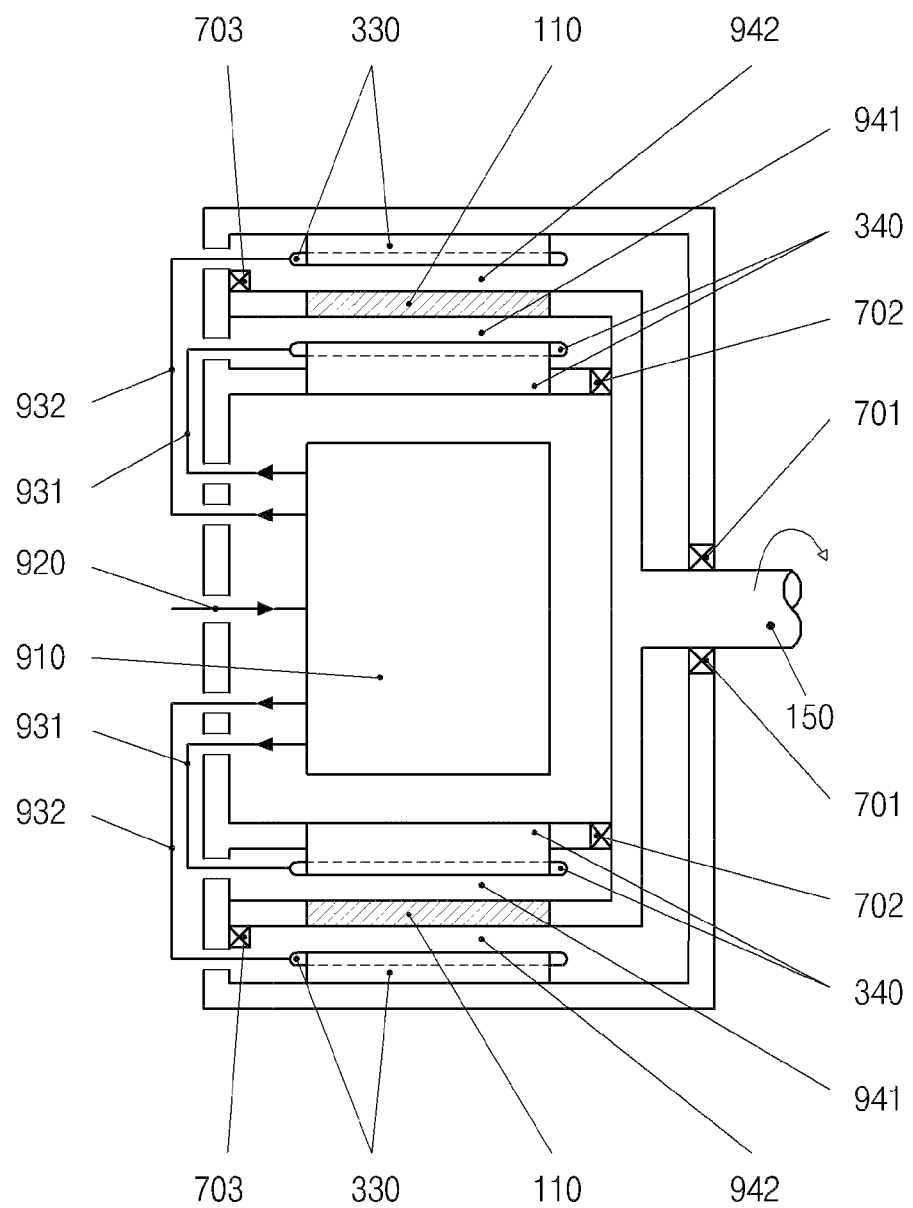

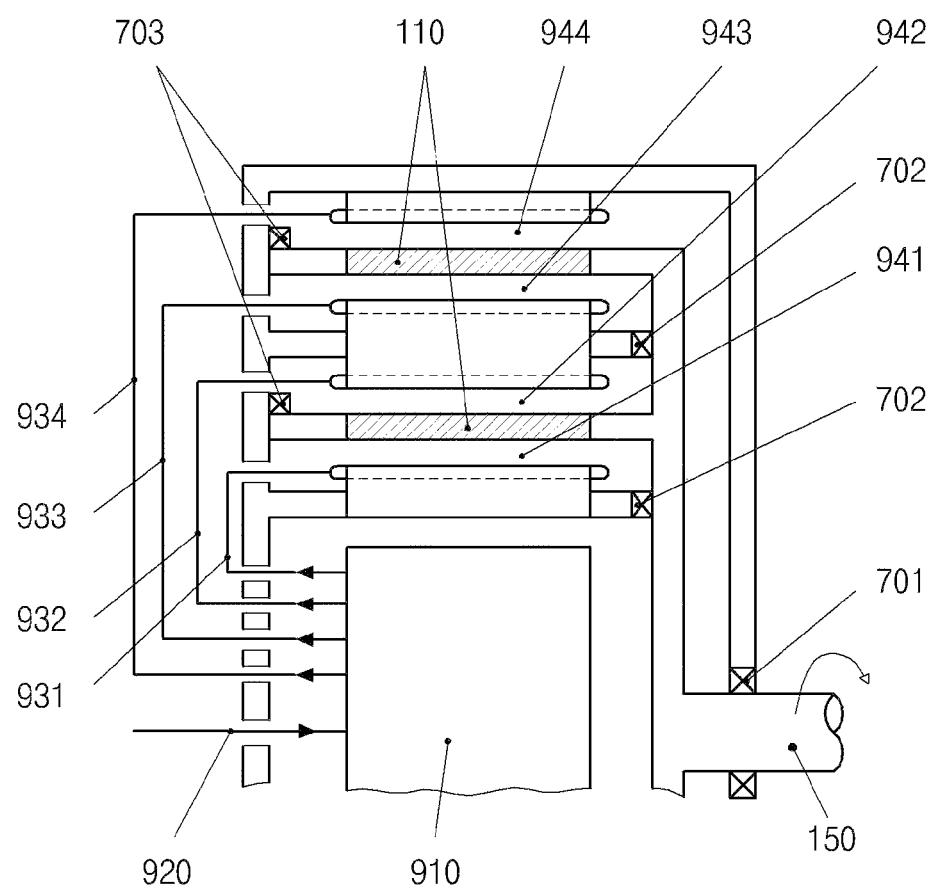
[FIG. 32]

[FIG. 33]
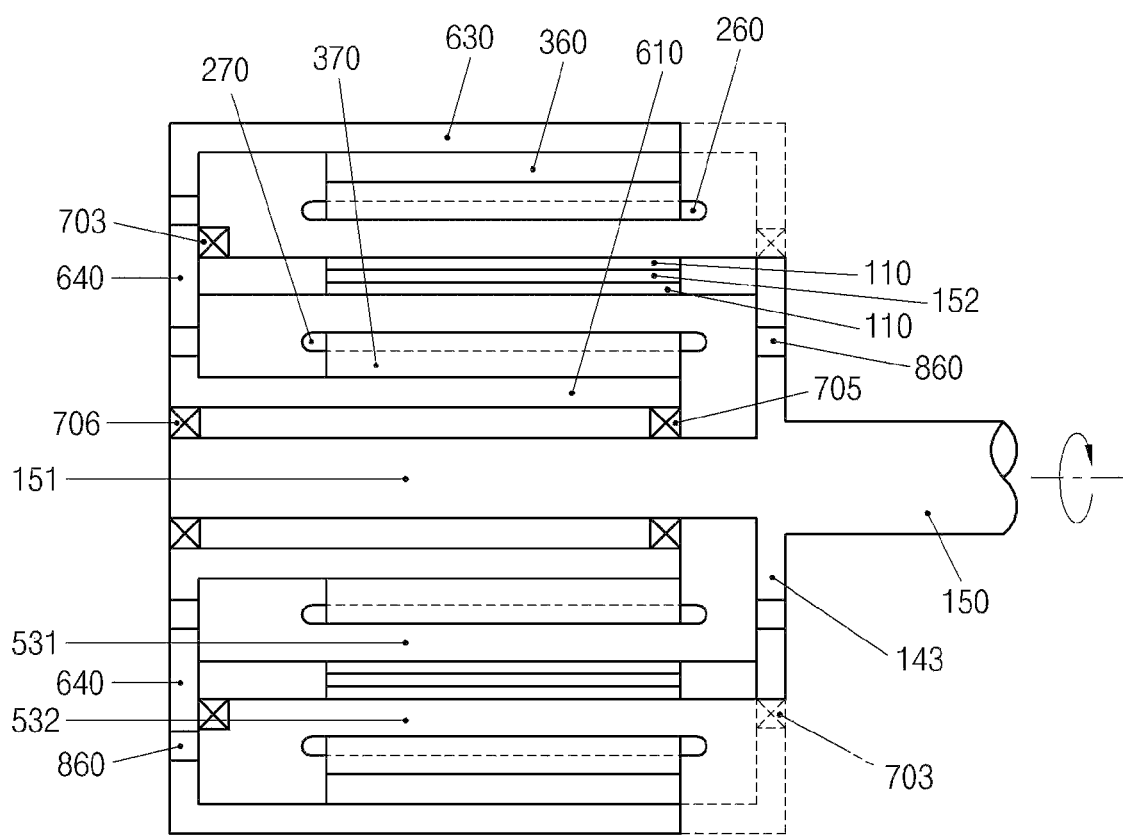

【FIG. 34】
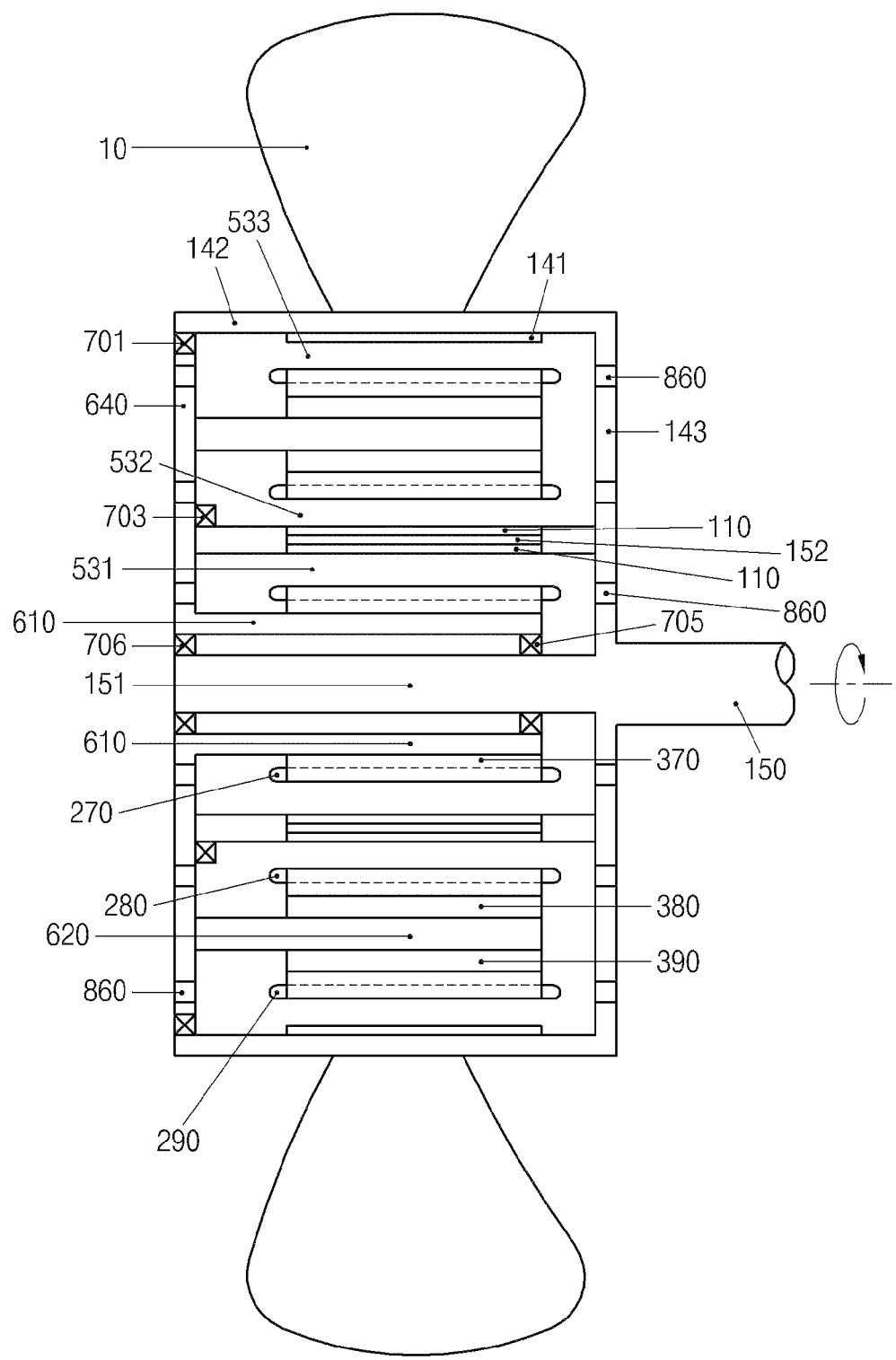

DUAL AND MULTIPLE AIR GAP ROTARY DEVICE

TECHNICAL FIELD

The present invention disclosed herein relates to a rotary device, such as an electric motor and a power generator, having dual and multiple air gaps.

BACKGROUND ART

In recent years, since an electric motor and a power generator require a high output as a robot device and a transportation unit such as a railroad vehicle, an electric vehicle, an electric ship, and an electric airplane increase, a rotary device having a high output and efficiency is increasingly demanded.

Also, as an electric motor in a robot field for factory automation and a power generator for producing electricity in an industrial field require a high output, efforts to achieve miniaturization and price competitiveness are increasing.

Particularly, the electric motor mounted to the robot and the transportation unit such as the railroad vehicle, the electric vehicle, the electric ship, and the electric airplane using electricity and the power generator for producing electricity in the industrial field require a high output and a small installation volume when installed on the transportation unit. Thus, the high output and small-sized electric motor and power generator (electric device) are required to be mas s-produced.

DISCLOSURE OF THE INVENTION

Technical Problem

The present invention provides a structure of a rotary device that generates more torque according to a shape of a permanent magnet and is firmly coupled and integrated with a support part (magnetic force application part) of a force or electric power generation portion when a dual and multiple air gap rotary device is configured to satisfy above-described requirements.

The present invention also provides a cooling device for reducing temperature increase because the dual and multiple air gap rotary device generates more heat from a plurality of wires than a typical rotary device.

Technical Solution

In accordance with an embodiment of the present invention, a rotary device which includes a rotor part 100, a stator part 400, an inner support part 610, and a housing part 600, wherein the inner support part 610 is coupled and fixed to the housing part 600, and the stator part 400 includes an inner stator part 340 which includes an inner iron core 320 coupled and fixed to the inner support part 610, and an inner wire 220 wound on the inner iron core 320; and an outer stator part 330 which includes an outer iron core 310 coupled and fixed to the inner circumferential surface of the housing part 600, and an outer wire 210 wound on the outer iron core 310, and the rotor part 100 includes a rotor-side magnetic force application part 110 which has an inner air gap 520 between the inner circumferential side thereof and the inner stator part 340 and an outer air gap 510 between the outer circumferential side thereof and the outer stator part 330; and a pair of end support parts 121 installed at respective ends of the rotor-side magnetic force application part 110, and at least one of the pair of end support parts 121 is coupled and fixed to a rotary shaft 150 which is rotatably installed in the housing part 600, is disclosed.

The rotor-side magnetic force application part 110 may include a plurality of radial direction permanent magnets 111 and a radial direction permanent magnet side surface support part 112 for supporting the plurality of radial direction permanent magnets 111, and the radial direction permanent magnets 111 may be arranged so that polarities of the permanent magnets are alternated between a →direction and a ← direction or between a ↑ direction and a ↓, direction along a circumferential direction from a rotation center of the rotor part 100.

The radial direction permanent magnet side surface support part 112 may be fixed and coupled to the end support part 121 so that radial direction permanent magnets 111 are not scattered when the rotor part 100 rotates.

The end support part 121 and the radial direction permanent magnet side surface support part 112 may be made of a magnetic material through which a magnetic flux easily passes or a non-magnetic material, the end support part 121 and the radial direction permanent magnet side surface support part 112 may have an integrated structure, a groove to which the radial direction permanent magnets 111 are inserted may be formed in the integrated structure, and the radial direction permanent magnets 111 may be attached to the integrated structure to prevent separation during rotation or inserted and coupled by applying an angle to a portion between the radial direction permanent magnet side surface support part 112, the end support part 121, and the radial direction permanent magnet 111.

The rotary device may further include a separation preventing means installed on an outer circumferential surface of the rotor part 100 to prevent the radial direction permanent magnet 111 from being separated in the radial direction after fixed to the radial direction permanent magnet side surface support part 112 and the end support part 121.

The radial direction permanent magnets 111 may be divided vertically in the radial direction, the divided permanent magnets may be arranged such that polarities of the divided permanent magnets are arranged in the same direction (↑, ↑) or different directions (↑, ↓), and a radial direction vertical permanent magnet support part 113 having an inner circumferential surface and an outer circumferential surface to which the vertically divided permanent magnets are fixed may be additionally provided between the vertically divided permanent magnets.

The end support part 121 and the radial direction permanent magnet side surface support part 112 may be made of a magnetic material through which a magnetic flux easily passes or a non-magnetic material, the end support part 121 and the radial direction permanent magnet side surface support part 112 may have an integrated structure, a groove to which the radial direction permanent magnets 111 are inserted may be formed in the integrated structure, and the radial direction permanent magnets 111 may be attached to the integrated structure to prevent separation during rotation or inserted and coupled by applying an angle to a portion between the radial direction permanent magnet side surface support part 112, the end support part 121, and the radial direction permanent magnet 111.

The rotary device may include a separation preventing means installed on the outer circumferential surface of the rotor part 100 to prevent separation of the radial direction permanent magnet 111 in the radial direction.

The radial direction permanent magnet side surface support part 112 and the radial direction vertical permanent magnet support part 113 may be integrated with each other or welded and coupled with each other.

The rotor-side magnetic force application part 110 may be provided separately from or integrated with the pair of end support parts 121 and include a radial direction vertical permanent magnet support part 113 having a cylindrical shape and a plurality of radial direction permanent magnets 111 that are coupled to an inner circumferential surface and an outer circumferential surface of the radial direction vertical permanent magnet support part 113.

The rotor-side magnetic force application part 110 may include a plurality of circumferential direction permanent magnets 114 and an iron core 115 when a circumferential direction permanent magnet is applied for supporting the circumferential direction permanent magnets 114, the plurality of circumferential direction permanent magnets 114 may be arranged so that polarities of the permanent magnets are alternated between the →direction and the ← direction or between the ↑ direction and the ↓, direction along a circumferential direction from the rotation center of the rotor part 100, and a magnetic flux may be concentrated on an air gap surface of the iron core 115 when the circumferential direction permanent magnet is applied.

The iron core 115 when the circumferential direction permanent magnet is applied may be fixed and coupled to the end support part 121 so that circumferential direction permanent magnets 114 are not scattered when the rotor part 100 rotates.

The circumferential direction permanent magnet 114 may be attached to the integrated structure or inserted and coupled to an angled portion between iron core 115 when the circumferential direction permanent magnet is applied, the end support part 121, and the circumferential direction permanent magnet 114 to prevent separation during rotation.

The rotary device may further include a separation preventing means installed on the outer circumferential surface of the rotor part 100 to prevent separation of the circumferential direction permanent magnet 114 in the radial direction.

The iron core 115 when the circumferential direction permanent magnet is applied and the end support part 121 may be integrated with each other or welded and coupled with each other.

The rotor-side magnetic force application part 110 may include a plurality of groove inserted type circumferential direction permanent magnets 116, a laminated iron core 117 when the groove inserted type circumferential direction permanent magnet 116 is applied, and a rotor part support part 118 when the circumferential direction permanent magnet is applied, which is fixed and coupled to the end support part 121.

The rotor part support parts 118 when the circumferential direction permanent magnet is applied may be arranged by one angle of 120°, 60°, 30°, or 15° along the circumferential direction from the rotation center of the rotary shaft 150.

The rotary device may further include a separation preventing means installed on the outer circumferential surface of the rotor part 100 to prevent separation of the groove inserted type circumferential direction permanent magnet 116 in the radial direction.

The rotor-side magnetic force application part 110 may include a plurality of circumferential direction permanent magnets 119, a laminated iron core 117 when the circumferential direction permanent magnet is applied, and a plurality of circumferential direction permanent magnet support parts 120 fixed and coupled to the end support part 121 and installed between the plurality of divided type circumferential direction permanent magnet 119.

The pair of circumferential direction permanent magnets 119 may be arranged in the circumferential direction with each of the circumferential direction permanent magnet support parts 120 therebetween, so that polarities of the permanent magnets in the circumferential direction are alternated between the →→ direction and the ← ← direction.

The rotary device may include a separation preventing means installed on the outer circumferential surface of the rotor part 100 to prevent separation of the circumferential direction permanent magnet 119 in the radial direction.

The rotary device may include a plurality of rotor part support parts 118 when the circumferential direction permanent magnet is applied, which are arranged by one angle of 120°, 60°, 30°, or 15° along the circumferential direction from the rotation center of the rotary shaft 150 and fixed and coupled to the end support part 121.

The rotary device may include a separation preventing means installed on the outer circumferential surface of the rotor part 100 to prevent separation of the circumferential direction permanent magnet 119 in the radial direction.

The rotor-side magnetic force application part 110 may include a plurality of groove inserted type circumferential direction permanent magnets 116, a magnetic laminated iron core 131 for supporting the groove inserted type circumferential direction permanent magnets 116, and a fixing bridge 132 for fixing the laminated iron core 131 to the end support part 121.

The fixing bridge 132 may have one cross-sectional shape among a circular shape, a polygonal shape, and an oval shape.

The rotor-side magnetic force application part 110 may further include a rotor part support part 118 when the circumferential direction permanent magnet is applied, which is fixed and coupled to the end support part 121.

The fixing bridge 132 may have one cross-sectional shape among a circular shape, a polygonal shape, and an oval shape.

The rotary device may further include an outer wire cooling fan 850 for cooling the outer wire 210 and an inner wire cooling fan 830 for cooling the inner wire 220.

A refrigerant flow hole 860 for cooling the outer wire and a refrigerant flow hole 840 for cooling the inner wire may be formed in the housing part 600, and the inner support part 610 may include a refrigerant passage 810 for cooling the inner wire installed in the shaft direction and a refrigerant passage nozzle 820 for cooling the inner wire, which is connected with the refrigerant passage 810 for cooling the inner wire and injects a refrigerant.

The outer wire cooling fan 850 and the inner wire cooling fan 830 may be installed on one of the inside and the outside of the housing part 600.

The refrigerant passage 810 for cooling the inner wire and the refrigerant passage nozzle 820 for cooling the inner wire may be formed in the inner support part 610 or separately installed.

The inner wire cooling fan 830 may include a wing support part 832 of the inner wire cooling fan in which a wing of the inner wire cooling fan is installed at the inside thereof.

The outer wire cooling fan 850 may include a wing support part 851 of the outer wire cooling fan in which a wing of the outer wire cooling fan is installed at the outside thereof.

The outer iron core 310 may be coupled with an outer wire cooling pipe 870 for cooling the outer wire 210, the inner iron core 320 may be coupled with an inner wire cooling pipe 880 for cooling the inner wire 210, and the outer wire cooling pipe 870 and the inner wire cooling pipe 880 may have one structure of a refrigerant circulation structure or a heat pipe structure.

The rotor part 100 may include at least one of an outer circumference-side installed bearing 703-1 installed on an outer circumference of the end support part 121, an end installed bearing 703-2 installed on an end in a direction of the rotary shaft 150 in the end support part 121, and an inner circumference-side installed bearing 703-3 installed on an inner circumferential surface of the end support part 121 to rotate with respect to the housing part 600.

The rotary shaft 150 may include a shaft extension portion 151 extending in a longitudinal direction of the rotary shaft and rotatably supported by the inner support part 610.

The inner support part 610 may have a hollow cylinder structure so that the shaft extension portion 151 is inserted in the shaft direction.

In accordance with another embodiment of the present invention, a rotary device having one or more pairs of an inner air gap and an outer air gap which includes a rotor part 100, a stator part 400, an inner support part 610, and a housing part 600, wherein the stator part 400 includes: a central stator part including a stator iron core 370 installed on an inner support part 610 disposed at a central portion and extending in a shaft direction in a circumferential direction and a stator wire 270 wound around the stator iron core 370; an outer stator part installed at an outermost portion and including a stator iron core 360 and a stator wire 270 wound around the stator iron core 370; and at least one intermediate stator part including an inner stator iron core 380 and an outer stator iron core 390, which are respectively installed on an inner circumferential surface and an outer circumferential surface of at least one iron core support part 620 extending in the shaft direction between the central stator part and the outer stator part to form a concentric circle with the outer stator part, and an inner stator wire 280 and an outer stator wire 290, which are respectively wound around the inner stator iron core 380 and the outer stator iron core 390, the rotor part 100 includes: a plurality of rotor-side magnetic force application parts 110 installed to have an inner air gap with respect to the inner stator wire installed at the inner circumference side and an outer air gap with respect to the outer stator wire installed at the outer circumference side; and a pair of end support parts 121 installed at respective ends of the rotor-side magnetic force application part 110, and at least one of the pair of end support parts 121 is fixed and coupled to a rotary shaft rotatably installed to the housing part 600, is disclosed.

A stator iron core and a stator wire wound around the stator iron core may be installed on an outer circumferential surface of the outer stator part in a circumferential direction, and the rotor part 100 may include an outer rotary part 142 rotatably installed and spaced apart from the stator wire installed on the outer circumferential surface of the outer stator part with an inner air gap therebetween and forming an outer circumference of the rotary device and a plurality of magnetic force application parts 141 to which the outer rotary part 142 is fixedly installed on an inner circumferential surface thereof in the circumferential direction.

The rotary shaft 150 may include a shaft extension portion 151 extending in a longitudinal direction of the rotary shaft and rotatably supported by the inner support part 610.

A power conversion device 910 for supplying a power to a wire of the stator part 400 may be installed at a center of the innermost stator part 400 based on a radial direction of the rotary shaft 150, and the power conversion device 910 may supply the power to the wire of the stator part 400 according to a preset control algorithm.

The power conversion device 910 for receiving a power induced from the wire of the stator part 400 may be installed at the center of the innermost stator part 400 based on the radial direction of the rotary shaft 150.

According to the present invention, a dual air gap rotary device includes a rotor part 100, a stator part 400, an inner support part, a housing part 600, and a bearing 700. The stator part 400 is firmly attached to the inner support part and the housing part 600, and the rotor part 100 is supported by the bearing 700 between the stator part 400 and two inner and outer air gaps 500 to rotate.

As the rotor-side magnetic force application part 110 is installed between the two air gaps of the outer air gap 510 and the inner air gap 520, energy conversion is implemented. That is, in case of an electric motor, electrical energy is converted into mechanical energy, and in case of a power generator, mechanical energy is converted into electrical energy. The rotor-side magnetic force application part 110 including a permanent magnet and an iron core is required to be structurally firmly coupled with the end support part 121 so that a constant distance between the outer air gap 510 and the inner air gap 520 is maintained. The rotor-side magnetic force application part 110 includes a permanent magnet including a radial direction permanent magnet 111 and a circumferential direction permanent magnet 114 and has a structure of supporting the permanent magnets and being coupled with the end support part 121.

Also, the present invention suggests a radial direction permanent magnet side surface support part 112 or a radial direction vertical permanent magnet support part 113 when the rotor-side magnetic force application part 110 has a structure of the radial direction permanent magnet 111.

Also, since the circumferential direction permanent magnet 114 according to the present invention may concentrate a magnetic flux to the air gap to obtain a high magnetic flux density, the rotary device including the circumferential direction permanent magnet 114 has an output greater than that of the rotary device including the radial direction permanent magnet 111. Also, the present invention suggests a rotor part support part 118 when the circumferential direction permanent magnet is applied and a divided type circumferential direction permanent magnet support part 120.

Also, the present invention discloses the rotor part 100 of the dual air gap rotary device characterized in structure of generating more torque or power when the rotor-side magnetic force application part 110 includes the radial direction permanent magnet 111 and the circumferential direction permanent magnet 114 and being firmly coupled with the end support part 121 in an integrated manner.

Also, since the dual air gap rotary device according to the present invention includes the outer wire 210 and the inner wire 220 to generate heat more than a typical rotary device, the present invention discloses a cooling device provided to each of the outer wire 210 and the inner wire 220 for reducing temperature increase.

Devices related to the cooling device include a refrigerant passage 810 for cooling the inner wire installed at a center of the inner support part, an inner wire cooling fan 830, a refrigerant flow hole 840 for cooling the inner wire, an outer wire cooling fan 850, a refrigerant flow hole 860 for cooling the outer wire, an outer wire cooling pipe 870, and an inner wire cooling pipe 880

Also, the multiple air gap rotary device according to the present invention may have four or more air gaps and be applied when an output greater than that of the dual air gap rotary device is required. The principle of the multiple air gap rotary device is similar to that of the dual air gap rotary device.

Also, as the power conversion device 910 is contained in the dual and multiple air gap rotary device when a space exists in the middle of the rotary device, a space for the power conversion device may be saved.

Advantageous Effects

The dual and multiple air gap rotary device according to the present invention is suitable for the transportation unit such as the railroad vehicle, the electric vehicle, the electric ship, and the electric airplane and the robot, which require the high output, the high efficiency, and the small volume. However, since the dual and multiple air gap rotary device includes two, four or more air gaps, the strong structure of the rotor is required.

When the force generation or power generation part (magnetic force application part) has the shape including the radial direction permanent magnet and the circumferential direction permanent magnet to satisfy the above-described requirements, more torque may be generated, and the rotor may be firmly coupled with the end support part 121 in the integrated manner. The dual and multiple air gap rotary device may operate at the same temperature as the typical rotary device by applying the cooling device to the wire. Also, as the power conversion device 910 is contained in the dual and multiple air gap rotary device when the space exists in the middle of the rotary device, the space of the power conversion device may be further saved.

BRIEF DESCRIPTION OF THE DRAWINGS

FIG. 1 is an entire conceptual view illustrating a stator part, a rotor part, a bearing, dual air gaps, and a cooling structure of a wire of the dual air gap rotary device according to the present invention.

FIG. 2 is a conceptual view of a rotor part illustrating a case when a rotor part permanent magnet of the dual air gap rotary device is a radial direction in FIG. 1.

FIG. 3 is a cross-sectional view illustrating the rotor part taken along direction A-A in FIG. 2.

FIG. 4 is a cross-sectional view illustrating a case when the rotor part permanent magnet is fixed by a vertical permanent magnet support part in FIG. 3.

FIG. 5 is a conceptual view illustrating a structure of supporting the rotor part permanent magnet in FIG. 4.

FIG. 6 is a conceptual view of the rotor part illustrating a case when the rotor part permanent magnet of the dual air gap rotary device is a circumferential direction in FIG. 1.

FIG. 7 is a cross-sectional view illustrating the rotor part taken along direction A-A in FIG. 6.

FIG. 8 is a view illustrating a laminated iron core and a support part when the rotor part permanent magnet has a groove inserted shape.

FIG. 9 is a conceptual view illustrating a structure of supporting the rotor part permanent magnet in FIG. 8.

FIG. 10 is a cross-sectional view illustrating the rotor part taken along direction A-A in FIG. 8.

FIG. 11 is a conceptual view illustrating a laminated iron core, a divided type circumferential direction permanent magnet, and a support part of the rotor part in FIG. 6.

FIG. 12 is a conceptual view illustrating the divided type circumferential direction permanent magnet support part 120 of the rotor part in FIG. 11.

FIG. 13 is a cross-sectional view taken along direction A-A in FIG. 11.

FIG. 14 is a conceptual view illustrating a rotor part support part when the circumferential direction permanent magnet is applied in FIG. 11.

FIG. 15 is a conceptual view illustrating a structure of supporting the rotor part permanent magnet of FIG. 14.

FIG. 16 is a cross-sectional view taken along direction A-A in FIG. 14.

FIG. 17 is a conceptual view illustrating a state in which a circumferential direction permanent magnet applied laminated iron core when fixed between end support parts by a bridge instead of a laminated iron core when the circumferential direction permanent magnet is applied in FIG. 8.

FIG. 18 is a conceptual view illustrating a fixing bridge between the end support parts and a rotor part support part when the circumferential direction permanent magnet is applied.

FIG. 19 is a cross-sectional view illustrating the rotor part taken along direction A-A in FIG. 17.

FIG. 20 is a conceptual view illustrating a case of installing only a circumferential direction permanent magnet applied laminated iron core when fixed between the end support parts by a bridge between permanent magnets.

FIG. 21 is a conceptual view illustrating a state of installing only a fixing bridge between the end support parts.

FIGS. 22a to 22d are cross-sectional perspective views illustrating the rotor part taken along direction A-A in FIG. 20 as embodiments of the rotor part in FIG. 20.

FIG. 23 is a conceptual view illustrating a refrigerant passage for cooling an inner wire installed at a center of an inner support part and a refrigerant passage nozzle for cooling the inner wire installed at the center of the inner support part in FIG. 1.

FIG. 24 is a conceptual view illustrating an inner wire cooling fan in FIG. 1.

FIG. 25 is a conceptual view illustrating an outer wire cooling fan in FIG. 1.

FIG. 26 is a detail view illustrating a refrigerant flow hole for cooling an inner wire of the rotor part and a structure of a bearing in FIG. 1.

FIG. 27 is a cross-sectional view taken along direction A-A in FIG. 26 and illustrating a partial type bearing 703-11 and an entire type bearing 703-12 in a rotor and housing part coupling bearing.

FIG. 28 is a detail view illustrating an inner support part vertical bearing 704 in a vertical shaft direction of the inner support part and the housing part as another bearing shape.

FIG. 29 is a view illustrating a quadruple air gap rotary device when four air gaps are provided.

FIG. 30 is a view illustrating a sextuple air gap device when six air gaps are provided.

FIG. 31 is a view illustrating a power conversion device and rotary device integrated type in which the dual air gap rotary device includes a power conversion device therein.

FIG. 32 is a view illustrating a power conversion device and rotary device integrated type in which the quadruple air gap rotary device includes a power conversion device therein.

FIG. 33 is a view illustrating a modified example showing a rotary shaft extends in a shaft direction in an embodiment of FIG. 30.

FIG. 34 is a view illustrating an example of an external rotary device in which a blade or the like is installed on an outer circumferential side of a rotor part as a modified example of the embodiment of FIG. 30.

MODE FOR CARRYING OUT THE INVENTION

Hereinafter, a structure of a dual and multiple air gap rotary device according to the present invention will be described with reference to the accompanying drawings.

First, the gist of the present invention may be applied to all of a rotor part of a rotary device such as an electric motor for generating a rotary force as a power is applied and a power generator for generating a power by a rotary force, and a stator structure for applying a three-phase power or generating a power may be substantially the same or similar except for a typical rotor structure of the electric motor or the power generator.

Hereinafter, the present invention will be described by using an embodiment of a rotor device.

According to the present invention, a rotor part of a dual air gap rotary device constantly maintains dual air gaps, and a multiple air gap rotary device includes four or more air gaps and has a support structure with a permanent magnet so as to provide or generate great torque. Each of the dual air gap rotary device and the multiple air gap rotary device may include various embodiments. Hereinafter, the rotary device according to the present invention will be described with reference to the accompanying drawings and embodiments.

Structure of Dual Air Gap Rotary Device

As illustrated in FIG. 1, a dual air gap rotary device according to a first embodiment of the present invention includes a rotor part 100, a stator part 400, an inner support part 610, a housing part 600, and a bearing 700. The stator part 400 is firmly attached to the inner support part 610 and the housing part 600, and the rotor part 100 is supported by the bearing 700 between the stator part 400 and two inner and outer air gaps 500 to rotate.

The bearing 700 includes a rotor and shaft coupling bearing 701, a rotor and inner support part coupling bearing 702, and a rotator and housing part coupling bearing 703. When an inner air gap 520 is secured because the rotor has a short length to realize a stable structure, the rotor and the inner support part coupling bearing 702 is not required. In some cases, the bearing 700 may include only the rotor and shaft coupling bearing 701 without the rotor and inner support part coupling bearing 702 and the rotator and housing part coupling bearing 703.

Also, the bearing is a component of allowing a member rotating relatively to a member in a fixed state to smoothly rotate. The position, the structure, and the installation number of the bearing 700 may be determined according to shaft directional support and/or radial directional support at a proper position.

Also, since reference numerals applied in each drawing are applied for convenience, various configurations may be implemented for necessity of the shaft support and/or radial support at a corresponding position.

In the dual air gap rotary device, the rotor part of the dual air gap rotary device may include a rotor-side magnetic force application part 110 and an end support part 121, and the stator part 400 may include a wire part 200 through which current flows and an iron core part 300 through which magnetic flux flows.

The stator part 400 may include the wire part 200 through which current flows and the iron core part 300 through which a magnetic flux flows, the wire part 200 may include an outer wire 210 and an inner wire 220, and the iron core part 300 may include an outer iron core 310 and an inner iron core 320.

That is, the stator part 400 may be divided into an outer stator part 330 including the outer wire 210 and the outer iron core 310 and an inner stator part 340 including the inner wire 220 and the inner iron core 320.

Here, as illustrated in FIGS. 29 to 32, the stator part 400 may have a multiple air gap structure of including a stator iron core fixed and coupled to the housing part 600 and a stator wire wound around the stator iron core and using a rotation center of a rotary shaft 150 as a concentric circle center instead of including two components of the outer stator part 330 and the inner stator part 340, i.e., a dual air gap structure.

As an outer air gap 510 is disposed between the outer stator part 330 and the rotor part 100, and an inner air gap 520 is disposed between the inner stator part 340 and the rotor part 100, two air gaps and furthermore multiple air gaps, i.e., the inner and the outer air gaps 500, are configured. Theoretically, when the number of the air gaps increases twice, a power density increases twice.

As the rotor-side magnetic force application part 110 is installed between the two air gaps of the outer air gap 510 and the inner air gap 520, energy conversion is implemented. That is, in case of an electric motor, electrical energy is converted into mechanical energy, and in case of a power generator, mechanical energy is converted into electrical energy. The rotor-side magnetic force application part 110 including a permanent magnet and an iron core is required to be structurally firmly coupled with the end support part 121 so that a constant distance between the outer air gap 510 and the inner air gap 520 is maintained.

Here, as illustrated in FIGS. 33 and 34, in the rotor part 100, the rotor-side magnetic force application part 110 including the permanent magnet may further include a support member 152 coupled to an inner circumferential surface and an outer circumferential surface thereof, so that the rotor-side magnetic force application part 110 is stably supported.

The rotor-side magnetic force application part 110 that is the most important portion in energy conversion may use the permanent magnet to electrically generate a large amount of magnetic fluxes, require a robust structure to mechanically transmit a large rotary force, and be firmly connected with the left and right end support parts 121 to smoothly transmit a rotary force.

As described above, as illustrated in FIGS. 1, 29, 30, and 33, the stator part 400 may include: a central stator part including a stator iron core 370 installed on the inner support part 610 disposed at a central portion and extending in a shaft direction in a circumferential direction and a stator wire 270 wound around the stator iron core 370; an outer stator part installed at an outermost portion and including a stator iron core 360 and a stator wire 270 wound around the stator iron core 370; and at least one intermediate stator part including an inner stator iron core 380 and an outer stator iron core 390, which are respectively installed on an inner circumferential surface and an outer circumferential surface of at least one iron core support part 620 extending in the shaft direction between the central stator part and the outer stator part to form a concentric circle with the outer stator part, and an inner stator wire 280 and an outer stator wire 290, which are respectively wound around the inner stator iron core 380 and the outer stator iron core 390, so that an inner air gap and an outer air gap have one pair or more, i.e., the dual and multiple air gap structure.

The central stator part may include a stator iron core installed on the inner support part 610 disposed at the central portion and extending in the shaft direction in the circumferential direction and a stator wire wound around the stator iron core.

The stator iron core may include a predetermined number of protruding teeth installed on an outer circumferential surface of the inner support part 610 along the circumferential direction so that the stator wire is wound therearound.

Also, the stator wire that is a coil wound around the protruding teeth of the stator iron core may be variously configured.

The outer stator part may be installed at an outermost portion of the rotary device and include a stator iron core and a stator wire wound around the stator iron core.

The stator iron core may be installed at the outermost portion of the rotary device, e.g., an inner circumferential surface of an outer portion 630 of the housing 600 and including a predetermined number of protruding teeth installed on an inner circumferential surface of an outermost portion along the circumferential direction so that the stator wire is wound therearound.

Also, the stator wire that is a coil wound around the protruding teeth of the stator iron core may be variously configured.

The number of the at least one intermediate stator part may be determined by the number of the inner air gap and the outer air gap. The at least one intermediate stator part may include the inner stator iron core 380 and the outer stator iron core 390, which are respectively installed on the inner circumferential surface and the outer circumferential surface of the at least one iron core support part 620 extending in the shaft direction between the central stator part and the outer stator part to form a concentric circle with the outer stator part, and the inner stator wire 280 and the outer stator wire 290, which are respectively wound around the inner stator iron core 380 and the outer stator iron core 390.

That is, in the intermediate stator part, the inner stator wire 280 installed at a relatively inner circumference side forms an inner air gap 532 with the rotor-side magnetic force application part 110 of the rotor part 100, and the outer stator wire 290 installed at an outer circumference side forms an outer air gap 533 with the rotor-side magnetic force application part 110 of the rotor part 100.

Specifically, the rotor part 100 may include: a plurality of rotor-side magnetic force application parts 110 installed to have an inner air gap 531 with respect to the inner stator wire 280 of the intermediate stator part disposed at the relatively inner circumference side and an outer air gap 532 with respect to the outer stator wire 290 of the intermediate stator part disposed at the outer circumference side; and a pair of end support parts 121 installed at respective ends of the rotor-side magnetic force application part 110.

Here, at least one of the pair of end support parts 121, as a side surface 143 of the rotor part, may be fixed and coupled to the rotary shaft 150 that is rotatably installed on the housing part 600.

The inner support part 610 disposed at a shaft portion of the rotary shaft of the rotary device according to the present invention may be variously configured.

For example, the inner support part 610 may rotatably support the rotary shaft 150 at the shaft portion of the rotary shaft 150 so as to rotatably support the rotor part 100 including the rotary shaft 150.

To this end, the bearing 702 is installed at a portion at which the inner support part 610 supports the rotary shaft 150 in order to rotatably support the rotary shaft 150.

The inner support part 610 may include all sorts of components as long as the components rotatably support the rotary shaft 150 at the shaft portion thereof.

Specifically, when the rotary shaft 150 is installed to cross the shaft portion of the rotary device (reference numeral 151), the inner support part 610 may have a hollow cylinder structure so that the rotary shaft 150 is inserted therein, and a shaft directional bearing 706 and a radial directional bearing 705 may be provided to rotatably support the rotary shaft 150 as illustrated in FIGS. 33 and 34.

Here, the inner support part 610 may be disposed at a central portion, and the stator part 400 may be coupled thereto.

Specifically, the inner iron core 320 may be coupled to an outer circumference of the inner support part 610, and the inner wire 220 may be wound around the inner iron core 320.

The housing part 600 that is a component including the inner support part 610 to constitute a main body of the rotary device may be variously configured according to a usage environment of the rotary device. For example, the housing part 600 may form an outer circumferential surface of the rotary device as illustrated in FIG. 1.

As illustrated in FIG. 1, the housing 600 may include a side plate part 640 obtained by forming the inner support part 610 in the shaft direction and an outer part 630 extending from an outer circumference of the side plate part 640 in the shaft direction to form a longitudinal cross-sectional shape of 'U'.

The side plate part 640 that is a component forming the shaft directional side surface and obtained by forming the inner support part 610 in the shaft direction, may be variously configured.

The outer part 630 that is a component extending from the outer circumference of the side plate part 640 in the shaft direction may be variously configured.

The outer iron core 360 may be coupled to an inner circumferential surface of the outer part 630, and the outer wire 260 may be wound around the outer iron core 360.

As illustrated in FIG. 33, the outer part 630 may have a size of allowing the outer iron core 360 to be coupled to an end thereof in correspondence to the rotor-side magnetic force application part 110 of the rotor part 100 for a light weight and a compact size.

Here, as expressed by a dotted line in FIG. 33, the outer part 630 may rotatably support an outer circumferential surface of the rotor part 100 by using the bearing 703 for stable support of the rotor part 100.

As described above, the stator part 400 may include the stator iron core fixed and coupled to the housing part 600 and the stator wire wound around the stator iron core instead of including two components of the outer stator part 330 and the inner stator part 340 as illustrated in FIGS. 29 to 32, and 2n (here, n is a natural number of 1 or more) stator iron cores and stator wires may be installed by using the rotation center of the rotary shaft 150 as a concentric circle center.

Here, the housing 600 may additionally include an iron core support part 620 extending in the shaft direction between the inner support part 610 and the outer part 630.

The iron core support part 620 that is a component extending in the shaft direction between the inner support part 610 and the outer part 630 may be variously configured as long as a stator iron core that will be described later is able to be installed.

As illustrated in FIG. 30, an end support part support bearing 702 may be installed on an end of the iron core support part 620 to rotatably support the end support part 121.

The rotary device according to the present invention may have a rotary-type structure such as a wing of a fan on the outer circumference surface of the rotor part 100.

Here, the housing 600 may have a structure in which the outer part 6 is omitted as illustrated in FIG. 34 instead of the structure having the 'U'-shape including the side plate part 640 and the outer part 630 in FIG. 1.

Here, the rotor part 100 may include an outer rotary part 142 rotatably installed by being spaced apart from the stator part 400 with an inner air gap therebetween and forming the outer circumference of the rotary device and a plurality of magnetic force application parts 141 to which the outer rotary part 142 is fixedly installed on an inner circumferential surface thereof in a circumferential direction.

The outer rotary part 142 that is a component rotatably installed by being spaced apart from the stator part 400 with the inner air gap therebetween and forming the outer circumference of the rotary device may have various appearances according to use of the rotary device.

For example, the rotary device according to the present invention includes a fan, a plurality of blades 10 may be coupled to or integrated with the outer rotary part 142.

The plurality of magnetic force application parts 141 that are components in which the outer rotary part 142 is fixed to the inner circumferential surface in a circumference direction thereof may be variously arranged by using permanent magnets.

In case of an embodiment in FIG. 34, the rotary shaft 150 may be installed to cross the shaft portion of the rotary device (reference numeral 151). Here, as illustrated in FIG. 34, the inner support part 610 may have a hollow cylinder structure so that a shaft extension portion 151 of the rotary shaft 150 is inserted thereinto, and the shaft directional bearing 706 and the radial directional bearing 705 may be provided to rotatably support the rotary shaft 150.

Here, the inner support part 610 may be disposed at a central portion, and the stator part 400 may be coupled thereto.

Specifically, the inner iron core 320 may be coupled to an outer circumference of the inner support part 610, and the inner wire 220 may be wound around the inner iron core 320.

Rotor Part when Radial Direction Permanent Magnet is Applied

As illustrated in FIG. 2, the rotor part 100 of the dual air gap rotary device includes the rotor-side magnetic force application part 110 and the end support part 121, and the rotor-side magnetic force application part 110 includes a radial direction permanent magnet 111 and a radial direction permanent magnet side surface support part 112 for supporting the radial direction permanent magnet 111. The radial direction permanent magnets 111 are arranged such that polarities of the permanent magnets are alternated between a ↑ direction and a ↓, direction along a radial direction from a center of the rotor. The radial direction permanent magnet 111 may be firmly fixed to the radial direction permanent magnet side surface support part 112 and the end support part 121 so that the radial direction permanent magnets 111 are not scattered when the rotor part 100 rotates.

The end support part 121 and the radial direction permanent magnet side surface support part 112 may be made of a magnetic material through which a magnetic flux easily passes or a non-magnetic material.

When the end support part 121 and the radial direction permanent magnet side surface support part 112 are made of the same material, a groove to which the radial direction permanent magnet 111 may be made of one material and processed without a welding work, and the structure of the rotor part 100 may strongly maintain a degree of precision.

The radial direction permanent magnet 111 may be prevented from being separated by using an adhesive to fix the radial direction permanent magnet 111 or by applying an angle between the permanent magnet side surface support part 112, the end support part 121, and the radial direction permanent magnet 111 and inserting an adhesive therebetween.

As another method, the radial direction permanent magnet 111 may be prevented from being separated by fixing the radial direction permanent magnet 111 to the permanent magnet side surface support part 112 and the end support part 121 and then winding a strong fiber thread in a circumferential direction of the outer circumference of the rotor part 100 or reinforcing an inconel having a high strength in a cylindrical shape.

For reference, the fiber thread or the cylindrical inconel that is a separation preventing means for preventing separation in the radial direction may be used to reinforce a whole or a portion of the outer circumference of the rotor part 100. The fiber thread or the cylindrical inconel is not expressed in the drawings for convenience.

FIG. 3 is a cross-sectional view illustrating the rotor part taken along direction A-A in FIG. 2. FIG. 3 illustrates the radial direction permanent magnet 111 and the permanent magnet side surface support part 112 of the rotor-side magnetic force application part 110.

FIG. 4 illustrates a case when the radial direction permanent magnet 111 is fixed to the permanent magnet side surface support part 112 and a radial direction vertical permanent magnet support part 113. The radial direction vertical permanent magnet support part 113 is added to further strongly support the radial direction permanent magnet 111. When the radial direction vertical permanent magnet support part 113 is firmly fixed to the permanent magnet side surface support part 112 and the end support part 121 through welding or the like, the extremely strong rotor part 100 may be provided, and the dual air gap rotary device may have a further stable structure.

The radial direction permanent magnets 111 may be arranged such that the polarities of the permanent magnets are alternated between the ↑ direction and the ↓, direction along the radial direction from the center of the rotor and installed at an inner side and an outer side of the radial direction vertical permanent magnet support part 113 in the same direction (↑, ↑) or different directions (↑, ↓).

Likewise, the radial direction permanent magnet 111 may be firmly fixed to the radial direction permanent magnet side surface support part 112 and the end support part 121 so that the radial direction permanent magnets 111 are not scattered when the rotor part 100 rotates.

The radial direction permanent magnet side surface support part 112, the end support part 121, and the radial direction vertical permanent magnet support part 113 may be made of a magnetic material through which a magnetic flux easily passes or a non-magnetic material.

The radial direction permanent magnet 111 may be prevented from being separated by using an adhesive to fix the radial direction permanent magnet 111 or by applying an angle between the permanent magnet side surface support part 112, the end support part 121, and the radial direction vertical permanent magnet support part 113 and inserting an adhesive therebetween.

As further another method, the radial direction permanent magnet 111 may be prevented from being separated by fixing the radial direction permanent magnet 111 to the permanent magnet side surface support part 112, the end support part 121, and the radial direction vertical permanent magnet support part 113 and then winding a strong fiber thread in the circumferential direction of the outer circumference of the rotor part 100 or reinforcing an inconel having a high strength in a cylindrical shape (separation preventing means).

FIG. 5 is a conceptual view illustrating a structure in which the rotor part supports the permanent magnet in FIG. 4. FIG. 5 shows the permanent magnet side surface support part 112, the end support part 121, and the radial direction vertical permanent magnet support part 113 except for the radial direction permanent magnet 111. The permanent magnet side surface support part 112, the end support part 121, and the radial direction vertical permanent magnet support part 113 may be made of a magnetic material or a non-magnetic material and preferably welded for forming a strong structure. A low speed and small-sized rotary device may be simply manufactured by using only the cylindrical radial direction vertical permanent magnet support part 113 when the rotor part 100 has a stable structure without the permanent magnet side surface support part 112.

When the end support part 121 and the cylindrical radial direction permanent magnet side surface support part 113 are made of the same material, the end support part 121 and the cylindrical radial direction permanent magnet side surface support part 113 may be made of one material without a welding work, and the structure of the rotor part 100 may strongly maintain the degree of precision.

The rotor part 100 may rotate by a magnetic action of the rotor-side magnetic force application part 110, or the rotary shaft 150 may be coupled to one of a pair of end support parts 121 so that the rotor-side magnetic force application part 110 rotates.

When the rotary device according to the present invention is realized by a motor, the rotary shaft 150 that is a component of outputting a rotary force of the rotor-side magnetic force application part 110 rotating and driven by a magnetic action of the stator part 400 to the outside may be variously configured.

For example, the end support part 121 may have a circular disc shape to be coupled with the rotary shaft 150, and the rotary shaft 150 may be coupled to a center of the circular disc as a separate member or in an integrated manner.

Rotor Part when Circumferential Direction Permanent Magnet is Applied

As illustrated in FIG. 6, the rotor part 100 of the dual air gap rotary device includes the rotor-side magnetic force application part 110 and the end support part 121, and the rotor-side magnetic force application part 110 includes a circumferential direction permanent magnet 114 and an iron core 115 when the circumferential direction permanent magnet is applied for supporting the circumferential direction permanent magnet 114. The iron core 115 when the circumferential direction permanent magnet is applied is required to be made of a magnetic material.

The circumferential direction permanent magnets 114 may be arranged such that polarities of the permanent magnets are alternated between a →direction and a ← direction along a circumferential direction from a center of the rotor part to focus a magnetic flux to an air gap surface of the iron core 115 when the circumferential direction permanent magnet is applied, thereby forming a high air gap magnet density and generating a high torque or power.

The radial directional permanent magnet 114 may be firmly fixed to the circumferential direction permanent magnet 114 and the end support part 121 so that the circumferential directional permanent magnets 114 are not scattered when the rotor part 100 rotates.

The end support part 121 may be made of a magnetic material through which a magnetic flux easily passes or a non-magnetic material.

The circumferential direction permanent magnet 114 may be prevented from being separated by using an adhesive to fix the circumferential direction permanent magnet 114 or by applying an angle between the iron core 115 when the circumferential direction permanent magnet is applied, the end support part 121, and the circumferential direction permanent magnet 114 and inserting an adhesive therebetween (separation preventing means).

As another method, the circumferential direction permanent magnet 114 may be prevented from being separated by fixing the iron core 115 when the circumferential direction permanent magnet is applied and the end support part 121 and then winding a strong fiber thread in the circumferential direction of the outer circumference of the rotor part 100 or reinforcing an inconel having a high strength in a cylindrical shape (separation preventing means).

For reference, the fiber thread or the cylindrical inconel that is a separation preventing means for preventing separation in the radial direction may be used to reinforce a whole or a portion of the outer circumference of the rotor part 100. The fiber thread or the cylindrical inconel is not expressed in the drawings for convenience.

When the end support part 121 and the iron core 115 when the circumferential direction permanent magnet is applied are made of the same material, a groove to which the circumferential direction permanent magnet 114 may be made of the same material and processed without a welding work, and the structure of the rotor part 100 may strongly maintain the degree of precision.

FIG. 7 is a cross-sectional view illustrating the rotor part taken along direction A-A in FIG. 6. FIG. 7 illustrates the circumferential direction permanent magnet 114 and the iron core 115 when the circumferential direction permanent magnet is applied for supporting the circumferential direction permanent magnet 114 and allowing magnetic flux flows through the air gap, which constitute the rotor-side magnetic force application part 110.

FIG. 8 is a view illustrating a laminated iron core and a support part when the rotor part permanent magnet in FIG. 6 has a groove insertion shape. In FIG. 8, the rotor part 100 of the rotary device includes the rotor-side magnetic force application part 110 and the end support part 121, and the rotor-side magnetic force application part 110 includes a groove inserted type circumferential direction permanent magnet 116, a laminated iron core 117 when the circumferential direction permanent magnet is applied, and a rotor part support part 118 when the circumferential direction permanent magnet is applied.

The groove inserted type circumferential direction permanent magnet 116 forms a stronger structure for groove insertion to the end support part 121 to generate a magnetic flux and sustain a rotary force.

In general, a high frequency current is required to obtain a high rotation number in the rotary device. However, the laminated iron core 117 when the circumferential direction permanent magnet is applied may be applied to reduce a loss in a high frequency but vulnerable in terms of a structure.

To compensate this, the rotor part support part 118 when the circumferential direction permanent magnet is applied may be welded to the end support parts 121 disposed at left and right sides thereof. Thus, the rotor part 100 of the dual air gap rotary device that is operated in high speed and extremely strong may be obtained. The rotor part support part 118 when the circumferential direction permanent magnet is applied may be made of a magnetic material or a non-magnetic material. The magnetic material may generate a torque or a power greater than that of the non-magnetic material.

The laminated iron core 117 when the circumferential direction permanent magnet is applied and the rotor part support part 118 when the circumferential direction permanent magnet is applied may be firmly fixed so that the groove inserted type circumferential direction permanent magnets 116 are not scattered when the rotor part 100 rotates.

The groove inserted type circumferential direction permanent magnet 116 may be prevented from being separated by using an adhesive to fix groove inserted type circumferential direction permanent magnet 116 or by applying an angle between the laminated iron core 117 when the circumferential direction permanent magnet is applied, the end support part 121, and the groove inserted type circumferential direction permanent magnet 116 and inserting an adhesive therebetween (separation preventing means).

As further another method, the groove inserted type circumferential direction permanent magnet 116 may be prevented from being separated by fixing the groove inserted type circumferential direction permanent magnet 116 to the laminated iron core 117 when the circumferential direction permanent magnet is applied, the end support part 121, and the rotor part support part 118 when the circumferential direction permanent magnet is applied and then winding a strong fiber thread in the circumferential direction of the outer circumference of the rotor part 100 or reinforcing an inconel having a high strength in a cylindrical shape (separation preventing means).

For reference, the fiber thread or the cylindrical inconel that is a separation preventing means for preventing separation in the radial direction may be used to reinforce a whole or a portion of the outer circumference of the rotor part 100. The fiber thread or the cylindrical inconel is not expressed in the drawings for convenience.

FIG. 9 is a conceptual view illustrating a structure in which the rotor part supports the permanent magnet in FIG. 8. The extremely strong rotor part 100 may be configured when the rotor part support part 118 when the circumferential direction permanent magnet is applied is welded to the end support part 121. In FIG. 9, four rotor part support parts 118 when the circumferential direction permanent magnet is applied are arranged by 90°. However, the rotor part support parts 118 when the circumferential direction permanent magnet is applied may be arranged by 120°, 60°, 30°, or 15° according to cases. When the rotor part support part 118 when the circumferential direction permanent magnet is applied and the end support part 121 are made of the same material and processed without the welding work, the structure of the rotor part 100 may strongly maintain the degree of precision.

FIG. 10 is a cross-sectional view illustrating the rotor part taken along direction A-A in FIG. 8. FIG. 10 illustrates the groove inserted type circumferential direction permanent magnet 116, the laminated iron core 117 when the circumferential direction permanent magnet is applied, and the rotor part support part 118 when the circumferential direction permanent magnet is applied, which constitute the rotor-side magnetic force application part 110. In FIG. 10, four rotor part support parts 118 when the circumferential direction permanent magnet is applied are arranged by 90°.

FIG. 11 is a conceptual view illustrating a laminated iron core, a divided type circumferential direction permanent magnet, and a support part of the rotor part in FIG. 6. The rotor part 100 having a further strong structure may be configured by welding a divided type circumferential direction permanent magnet 120 between end support parts 121.

This structure is configured by installing the divided type circumferential direction permanent magnet 120 between divided type circumferential direction permanent magnets 119 as illustrated in FIG. 11. The divided type circumferential direction permanent magnet 120 may be made of a magnetic material or a non-magnetic material.

An adhesive (separation preventing means) may be used to firmly fix the laminated iron core 117 when the circumferential direction permanent magnet is applied, the divided type circumferential direction permanent magnet 119, the divided type circumferential direction permanent magnet 120, and the end support part 121 and particularly fix the divided type circumferential direction permanent magnets 119 to each other for preventing scattering.

Alternatively, each of the laminated iron core 117 when the circumferential direction permanent magnet is applied, the divided type circumferential direction permanent magnet 119, the divided type circumferential direction permanent magnet support part 120, and the end support part 121 may be angled to form a groove insertion shape, and an adhesive is inserted thereto to prevent separation thereof.

As further another method, each of the laminated iron core 117 when the circumferential direction permanent magnet is applied, the divided type circumferential direction permanent magnet 119, the divided type circumferential direction permanent magnet support part 120, and the end support part 121 may be wound by a strong fiber thread in the circumferential direction of the outer circumference thereof or reinforced by an inconel having a high strength in a cylinder shape to prevent separation thereof (separation preventing means).

In case of rotating at an extremely high speed, the laminated iron core 117 when the circumferential direction permanent magnet is applied, the divided type circumferential direction permanent magnet 119, the divided type circumferential direction permanent magnet support part 120, and the end support part 121 may be welded to each other, attached by applying a groove insertion shaped angle therebetween and inserting an adhesive therebetween, and then wound by a strong fiber thread in the circumferential direction of the outer circumference thereof or reinforced by an inconel having a high strength in a cylinder shape to prevent separation thereof (separation preventing means).

FIG. 12 is a conceptual view illustrating the divided type circumferential direction permanent magnet support part 120 of the rotor part in FIG. 11. The divided type circumferential direction permanent magnet support part 120 may be welded between the end support parts 121 to form the rotor part 100 having a further strong structure.

When the divided type circumferential direction permanent magnet support part 120 and the end support part 121 are made of the same material and processed without the welding work, the structure of the rotor part 100 may strongly maintain the degree of precision.

FIG. 13 is a cross-sectional view taken along direction A-A in FIG. 11 and illustrating the laminated iron core 117 when the circumferential direction permanent magnet is applied, the divided type circumferential direction permanent magnet 119, and the divided type circumferential direction permanent magnet support part 120.

FIG. 14 is a conceptual view illustrating the rotor part support part 118 when the circumferential direction permanent magnet is applied in FIG. 11. The rotor part support part 118 when the circumferential direction permanent magnet is applied and the divided type circumferential direction permanent magnet support part 120 are welded between the end support parts 121 to form the rotor part 100 stronger than a case when the rotary device has a large size and rotates at a high speed. That is, the rotor-side magnetic force application part 110 includes the laminated iron core 117 when the circumferential direction permanent magnet is applied, the rotor part support part 118 when the circumferential direction permanent magnet is applied, the divided type circumferential direction permanent magnet 119, the divided type circumferential direction permanent magnet support part 120, in which a portion of the laminated iron core 117 when the circumferential direction permanent magnet is applied is replaced by the rotor part support part 118 when the circumferential direction permanent magnet is applied.

The rotor part support part 118 when the circumferential direction permanent magnet is applied and the divided type circumferential direction permanent magnet support part 120 are welded between the end support parts 121 to form the strong rotor-side magnetic force application part 110.

In this case, each of the end support part 121, the rotor part support part 118 when the circumferential direction permanent magnet is applied, and the divided type circumferential direction permanent magnet support part 120 may be made of all of a magnetic material or a non-magnetic material.

In FIG. 14, four rotor part support parts 118 when the circumferential direction permanent magnet is applied may be arranged by 90°. The rotor part support parts 118 when the circumferential direction permanent magnet is applied may be arranged by 120°, 60°, 30°, or 15° according to cases.

In case of rotating at an extremely high speed, the end support part 121, the rotor part support part 118 when the circumferential direction permanent magnet is applied, and the divided type circumferential direction permanent magnet support part 120 are welded, then the laminated iron core 117 when the circumferential direction permanent magnet is applied and the divided type circumferential direction permanent magnet 119 are angled to form a groove insertion shape and attached by inserting an adhesive therebetween, and then wound by a strong fiber thread in the circumferential direction of the outer circumference thereof or reinforced by an inconel having a high strength in a cylinder shape to prevent separation thereof (separation preventing means).

FIG. 15 is a conceptual view illustrating a structure of supporting the rotor part permanent magnet of FIG. 14. FIG. 15 specifically illustrates the rotor part support parts 118 when the circumferential direction permanent magnet is applied and the divided type circumferential direction permanent magnet support part 120.

When the end support part 121, the rotor part support part 118 when the circumferential direction permanent magnet is applied, and the divided type circumferential direction permanent magnet support part 120 are made of the same material and processed without the welding work, the structure of the rotor part 100 may strongly maintain the degree of precision.

FIG. 16 is a cross-sectional view taken along direction A-A in FIG. 14 and specifically illustrating the laminated iron core 117 when the circumferential direction permanent magnet is applied, the rotor part support part 118 when the circumferential direction permanent magnet is applied, the divided type circumferential direction permanent magnet 119, the divided type circumferential direction permanent magnet support part 120.

FIG. 17 illustrates a state in which a circumferential direction permanent magnet applied laminated iron core 131 when fixed between the end support parts 121 by a bridge in order to stabilize the structure when the laminated iron core 117 when the circumferential direction permanent magnet is applied rotates and form a further strong structure of the end support part in FIG. 8. A fixing bridge 132 is installed between the end support parts so that a magnetic flux easily passes through the circumferential direction permanent magnet applied laminated iron core 131 and the structure is stabilized.

FIG. 18 is a conceptual view illustrating the fixing bridge 132 between the end support parts 121 and the rotor part support part 118 when the circumferential direction permanent magnet is applied. When the strong structure of the rotor part is not obtained by using only the rotor part support part 118 when the circumferential direction permanent magnet is applied, the fixing bridge 132 is added between the end support parts to reinforce the structure. The fixing bridge 132 is fixed between the end support parts through welding or processing when connected with the end support parts 121.

When the rotor part support part 118 when the circumferential direction permanent magnet is applied, the end support part 121, and the fixing bridge 132 between the end support parts are made of the same material and processed without the welding work, the structure of the rotor part 100 may strongly maintain the degree of precision.

FIG. 19 is a cross-sectional view illustrating the rotor part taken along direction A-A in FIG. 17 and showing the groove inserted type circumferential direction permanent magnet 116, the rotor part support part 118 when the circumferential direction permanent magnet is applied, the circumferential direction permanent magnet applied laminated iron core 131 when fixed between the end support parts by the bridge, and the fixing bridge 132 between the end support parts. The further strong structure is obtained by additionally installing the fixing bridge 132 between the end support parts in FIG. 10.

The fixing bridge 132 between the end support parts may be positioned at a center of the circumferential direction permanent magnet applied laminated iron core 131 and made of a material through which a magnetic flux flows such as general steel material or stainless steel material.

Although the fixing bridge 132 between the end support parts has a circular shape in FIG. 19, the fixing bridge 132 between the end support parts may have various shapes such as a circular shape, an oval shape, a triangular shape, a rectangular shape, and a pentagonal shape to stably fix the circumferential direction permanent magnet applied laminated iron core 131 when fixed between the end support parts by the bridge.

FIG. 20 is a view illustrating a case of including only the circumferential direction permanent magnet applied laminated iron core 131 when fixed between the end support parts by the bridge and the fixing bridge 132 between the end support parts and omitting the rotor part support part 118 when the circumferential direction permanent magnet is applied in FIG. 17. In this case, the structure may have a relatively weak strength, but a manufacturing work may be simply performed.

FIG. 21 is a conceptual view illustrating a state in which the end support part 121 is fixed by using only the fixing bridge 132 between the end support parts.

When the end support part 121 and the fixing bridge 132 between the end support parts are made of the same material and processed without the welding work, the structure of the rotor part 100 may strongly maintain the degree of precision.

FIGS. 22a to 22d are cross-sectional views illustrating the rotor part taken along direction A-A in FIG. 20 as embodiments of the rotor part in FIG. 20.

As a first embodiment, the magnetic force application part 110 of the rotor part 100 may include: a plurality of laminated iron cores 131 installed between a pair of end support parts 121 disposed opposite to each other and spaced apart from each other in a circumferential direction; a plurality of fixing bridges 132 connected with the pair of end support parts 121 to fix the laminated iron cores 132; and a circumferential direction permanent magnet 116 installed between the laminated iron cores 131 that are adjacent to each other as illustrated in FIG. 22a.

The fixing bridge 132 may be positioned at a center of the laminated circumferential direction permanent magnet applied laminated iron core 131 to minimize reduction of a rotary force and made of a material through which a magnetic flux flows such as iron, stainless steel, and a composite material.

Also, the fixing bridge 132 may be fixed by various coupling methods such as bolting, welding, coupling using an adhesive.

Although the fixing bridge 132 has a circular shape, the fixing bridge 132 may have various shapes such as a circular shape, an oval shape, a triangular shape, a rectangular shape, and a pentagonal shape to stably fix the circumferential direction permanent magnet applied laminated iron core 131 when fixed between the end support parts by the bridge.

As a second embodiment that is a modified example of FIG. 22a, the magnetic force application part 110 of the rotor part 100 may include: a hollow cylinder shaped laminated iron core 133 in which a plurality of insertion grooves 116a to which permanent magnets 116 are inserted are formed; and the permanent magnets 116 inserted to the insertion holes 116a formed in the laminated iron core 133 as illustrated in FIG. 22b.

The laminated iron core 133 that is one iron core may have a hollow cylinder shape in which the plurality of insertion holes 116a to which permanent magnets 116 are inserted are formed.

Also, a plurality of fixing bridges 132 for fixing the laminated iron core 133 may be inserted between the permanent magnets 116.

As the permanent magnet 116 is inserted to the insertion hole 116a of the laminated iron core 133, the permanent magnet 116 may prevent an outer air gap 510 and an inner air gap 520 from being exposed.

As a third embodiment that is a modified example of FIG. 22b, the magnetic force application part 110 of the rotor part 100 may include: a hollow cylinder shaped laminated iron core 133 in which a plurality of insertion grooves 116a to which permanent magnets 116 are inserted are formed; and the permanent magnets 116 inserted to the insertion grooves 116 formed in the laminated iron core 133 as illustrated in FIG. 22c.

That is, as the insertion groove 116a is recessed from the outer circumferential surface, the permanent magnet 116 may be inserted to be exposed toward the outer circumferential surface.

As a fourth embodiment that is a modified example of FIG. 22b, a laminated iron core 135 of the magnetic force application part 110 of the rotor part 100 may be configured such that the plurality of insertion grooves 116a to which the permanent magnet 116 is inserted are exposed to the inner circumferential surface, i.e., the inner air gap 520. That is, the permanent magnet 116 may be exposed to the inner circumferential surface, i.e., the inner air gap 520.

As illustrated in FIG. 22b, the laminated iron core 133 in which the groove inserted type circumferential direction permanent magnet 116 is not in contact with the outer air gap 510 and the inner air gap 520, the laminated iron core 133 in which the groove inserted type circumferential direction permanent magnet 116 contacts only the outer air gap 510, and the laminated iron core 135 in which the groove inserted type circumferential direction permanent magnet 116 contacts only the inner air gap 520 have a great advantage in that the laminated iron core is simply assembled, and scattering of the permanent magnets is prevented although the rotary torque is slightly reduced.

The groove inserted type circumferential direction permanent magnet 116 illustrated in FIGS. 22b to 22d may have various shapes such as a rectangular shape, a rhombus shape, an oval shape, and a pentagonal shape to increase a torque and reduce a torque ripple and a cogging torque.

Also, a composite material may be wound around the outer circumferential surface of the laminated iron core in FIGS. 22b to 22d, particularly, FIG. 22c, to prevent separation of the permanent magnet 116 while rotating.

Cooling Structure

The dual air gap rotary device includes a cooling device provided to each of the outer wire 210 and the inner wire 220 for reducing temperature increase because the dual air gap rotary device generates more heat from the outer wire 210 and the inner wire 220 than a typical rotary device.

FIG. 1 shows a cooling structure. A cooling structure of the outer wire 210 includes an outer wire cooling fan 850, a refrigerant flow hole 860 for cooling the outer wire, and a cooling structure of the inner wire 220 includes an inner wire cooling fan 830, a refrigerant passage 810 for cooling the inner wire installed at a center of the inner support part 610, a refrigerant passage nozzle 820 for cooling the inner wire installed at the center of the inner support part, and a refrigerant flow hole 840 for cooling the inner wire. Also, the refrigerant flow hole 840 for cooling the inner wire may be defined in the rotor part 100 to dissipate heat of the inner wire 220.

The outer wire 210 is cooled as refrigerant (air or liquid) flows to the refrigerant flow hole 860 for cooling the outer wire through the outer wire cooling fan 850 when the rotor part 100 rotates. In some cases, the outer wire 210 may be cooled as the cooling refrigerant forcedly flows from the outside to the refrigerant flow hole 860 for cooling the outer wire without the outer wire cooling fan 850.

Likewise, the inner wire 220 may be cooled as the refrigerant (air or liquid) flows to the refrigerant passage 810 for cooling the inner wire installed at the center of the inner support part, the refrigerant passage nozzle 820 for cooling the inner wire installed at the center of the inner support part, and the refrigerant flow hole 840 for cooling the inner wire through the inner wire cooling fan 830 when the rotor part 100 rotates.

In some cases, the inner wire 220 may be cooled as the cooling refrigerant forcedly flows from the outside to the refrigerant passage 810 for cooling the inner wire installed at the center of the inner support part, the refrigerant passage nozzle 820 for cooling the inner wire installed at the center of the inner support part, and the refrigerant flow hole 840 for cooling the inner wire without the inner wire cooling fan 830. Also, each of the refrigerant flow hole 840 for cooling the inner wire and the refrigerant flow hole 860 for cooling the outer wire may be provided in plurality for easy cooling.

When an extremely high output is necessary according to purposes of an electric motor and a power generator, an extremely high input current may be necessary, and thus the wire may have an extremely high temperature. Here, the temperature of the wire may be remarkably reduced by respectively installing an outer wire cooling pipe 870 and an inner wire cooling pipe 880 to the outer iron core 310 and the inner iron core 320 and circulating the refrigerants through the outer wire cooling pipe 870 and the inner wire cooling pipe 880 for cooling. In some cases, the outer wire cooling pipe 870 and the inner wire cooling pipe 880 may be replaced by heater pipes.

FIG. 23 is a conceptual view illustrating the refrigerant passage 810 for cooling the inner wire installed at the center of the housing part 600 and the inner support part and the refrigerant passage nozzle 820 for cooling the inner wire installed at the center of the inner support part, which are paths through which the cooling refrigerants flow. Although one refrigerant passage 810 for cooling the inner wire is provided in FIG. 23, the refrigerant passage 810 for cooling the inner wire may be provided in plurality when the shaft has an enough diameter. Likewise, the refrigerant passage nozzle 820 for cooling the inner wire installed at the center of the inner support part may be provided in plurality.

FIG. 24 is a detail view illustrating the inner wire cooling fan 830 in FIG. 1. The inner wire cooling fan 830 includes a wing 831 of the inner wire cooling fan and a wing support part 832 of the inner wire cooling fan. In terms of a structure, the wing 831 of the inner wire cooling fan is installed inside the wing support part 832 of the inner wire cooling fan.

When the rotor part 100 rotates, the refrigerant may flow in one direction or both directions according to a direction of the wing 831 of the inner wire cooling fan, and the number and shape of the wing 831 of the fan may be variously provided.

FIG. 25 is a detail view illustrating the outer wire cooling fan 850 in FIG. 1. The outer wire cooling fan 850 includes a wing 851 of the outer wire cooling fan and a wing support part 852 of the outer wire cooling fan. In terms of a structure, the wing 851 of the outer wire cooling fan is installed on an outer circumference of the wing support part 852 of the outer wire cooling fan.

Likewise, when the rotor part 100 rotates, the refrigerant may flow in one direction or both directions according to a direction of the wing 851 of the outer wire cooling fan, and the number and shape of the wing 851 of the fan may be variously provided.

FIG. 26 is a detail view illustrating the refrigerant flow hole 840 for cooling the inner wire 220, the inner wire cooling fan 830, and the outer wire cooling fan 850 and additionally illustrating a structure of the bearing 700. The refrigerant flow hole 840 for cooling the inner wire that is a hole for dissipating heat of the inner wire may have various shapes.

A position of each of the inner wire cooling fan 830 and the outer wire cooling fan 850 may be changed as necessary.

Bearing Structure

FIG. 26 is a detail view illustrating the structure of the bearing 700 of the rotor part 100 in FIG. 1.

The bearing 700 of the rotor part 100 includes a rotor and shaft coupling bearing 701 for rotatably supporting the rotary shaft 150, a rotor and inner support part coupling bearing 702, and a rotor and housing part coupling bearing 703. When the rotor has a stable structure, the rotor and inner support part coupling bearing 702 is not necessary.

Particularly, when the rotor-side magnetic force application part 110 of the electric motor has a short length, the rotor part 100 may be supported by the rotor and shaft coupling bearing 701 capable of simultaneously supporting in the shaft direction and the radial direction without the rotor and inner support part coupling bearing 702 and the rotor and housing part coupling bearing 703.

In this case, the bearing may simply support the rotor part 100 by using only one rotor and shaft coupling bearing 701.

The rotor and housing part coupling bearing 703 may be one selected from an outer circumference-side installed bearing 703-1 in the rotor and housing part coupling bearing, an end installed bearing 703-2 in the rotor and housing part coupling bearing, and an inner circumference-side installed bearing 703-3 in the rotor and housing part coupling bearing.

FIG. 27 is a cross-sectional view taken along direction A-A in FIG. 26. FIG. 27 is a structural view illustrating a partial type bearing 703-11 and an entire type bearing 703-12 in the rotor and housing part coupling bearing. Since the rotor and housing part coupling bearing 703 is directly installed to the circumference of the rotor part 100, a small bearing is sufficient when the rotary device has a small diameter. Likewise, when the rotor part 100 has a large circumference, a big bearing is necessary. In this case, the partial type bearing 703-11 may be used for the outer circumference-side installed bearing 703-1 in the rotor and housing part coupling bearing in FIG. 27.

That is, the partial type bearing 703-11 is used for the outer circumference-side installed bearing 703-1 in the rotor and housing part coupling bearing in a left case, and the entire type bearing 703-12 is used for the outer circumference-side installed bearing 703-1 in the rotor and housing part coupling bearing in a right case. Likewise, each of the end installed bearing 703-2 in the rotor and housing part coupling bearing and the inner circumference-side installed bearing 703-3 in the rotor and housing part coupling bearing may use the partial type bearing or the entire type bearing.

FIG. 28 shows another bearing type. An inner support part vertical bearing 704 may be installed in a vertical shaft direction of the inner support part and the housing part 600. In this case, the bearing may have a size similar to that of the rotor and shaft coupling bearing 701. In some cases, likewise, the inner wire 220 may be cooled through the refrigerant passage 810 for cooling the inner wire installed at the center of the inner support part, the refrigerant passage nozzle 820 for cooling the inner wire installed at the center of the inner support part, the inner wire cooling fan 830, and the refrigerant flow hole 840 for cooling the inner wire.

Multiple Air Gap Structure

FIG. 29 is a view illustrating a quadruple air gap structure when four air gaps are provided to further increase the output. That is, a first air gap 531, a second air gap 532, a third air gap 533, and a fourth air gap 534 are provided to generate more power, and a maximum rotary force is generated in a given space. The configuration of the rotor, the bearing supporting structure, and the cooling method may include all of the cases suggested in the present invention.

FIG. 30 is a view illustrating a sextuple air gap structure when six air gaps are provided.

That is, a first air gap 531, a second air gap 532, a third air gap 533, a fourth air gap 534, a fifth air gap 535, a sixth air gap 536 are provided. In this case, also, the configuration of the rotor, the bearing supporting structure, and the cooling method may include all of the cases suggested in the present invention. Here, when a high output rotary device having eight air gaps, ten air gaps or more is necessary, an octuple, decuple or more air gap structure may be realized.

Power Conversion Device and Rotary Device Integrated Type

FIG. 31 is a view illustrating a case when the dual air gap rotary device includes a power conversion device 910 therein when a space exists in the middle of the rotary device. FIG. 31 shows a power conversion device and the rotary device integrated type. Since the rotary device suggested in the patent uses the permanent magnet, the rotary device requires the power conversion device. Here, since the power conversion device is installed in the dual air gap rotary device, a space for the power conversion device may be saved. The two air gaps include a rotary device integrated first air gap 941 and a power conversion device and rotary device integrated second air gap 942.

In case of the electric motor, a power is supplied to the power conversion device 910 through a power conversion device input power cable 920, and the power conversion device 910 supplies the power to the wire of the stator part through a first stator input power cable 931 and a second stator input power cable 932 by applying a control algorithm.

In case of the power generator, a generated power is supplied to the power conversion device 910 through the first stator input power cable 931 and the second stator input power cable 932, and the power conversion device 910 supplies the power to the outside through the power conversion device output power cable 920 by applying the control algorithm. In this case, the configuration of the rotor, the bearing supporting structure, and the cooling method may include all of the cases suggested in the present invention.

FIG. 32 is a view illustrating a case when the quadruple air gap rotary device includes the power conversion device 910 therein. FIG. 32 shows the power conversion device and rotary device integrated type. Four air gaps include a power conversion device and rotary device integrated first air gap 941, a power conversion device and rotary device integrated second air gap 942, a power conversion device and rotary device integrated third air gap 943, and a power conversion device and rotary device integrated fourth air gap 944.

In case of the electric motor, a power is supplied to the power conversion device 910 through a power conversion device input power cable 920, and the power conversion device 910 supplies the power to the wire of the stator part through a first stator input power cable 931, a second stator input power cable 932, a third stator input power cable 933, and a fourth stator input power cable 934 by applying a control algorithm. In case of the power generator, a generated power is supplied to the power conversion device 910 through the first stator input power cable 931, the second stator input power cable 932, the third stator input power cable 933, and the fourth stator input power cable 934, and the power conversion device 910 supplies the power to the outside through the power conversion device output power cable 920 by applying the control algorithm.

When a high output rotary device having six air gaps, eight air gaps, ten air gaps, twelve air gaps or more include the power conversion device 910, the electric motor supplies the power to the power conversion device 910 through the power conversion device input power cable 920, and the power conversion device 910 supplies the power to the wire of the stator part through the first stator input power cable 931, the second stator input power cable 932, the third stator input power cable 933, the fourth stator input power cable 934, and the fifth, sixth, seventh, eighth, and more stator input power cables.

In case of the power generator, a generated power is supplied to the power conversion device 910 through the first stator input power cable 931, the second stator input power cable 932, the third stator input power cable 933, the fourth stator input power cable 934, and the fifth, sixth, seventh, eighth, and more stator input power cables, and the power conversion device 910 supplies the power to the outside through the power conversion device output power cable 920 by applying the control algorithm.

In this case, the configuration of the rotor, the bearing supporting structure, and the cooling method may include all of the cases suggested in the present invention.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

DESCRIPTION OF REFERENCE NUMERALS

- 100: Rotor part 110: Rotor-side magnetic force application part
- 111: Radial direction permanent magnet 112: Radial direction permanent magnet side surface support part
- 113: Radial direction vertical permanent magnet support part 114: Circumferential direction permanent magnet
- 115: Iron core when the circumferential direction permanent magnet is applied 116: Groove inserted type circumferential direction permanent magnet
- 117: Laminated iron core when the circumferential direction permanent magnet is applied 118: Rotor part support part when the circumferential direction permanent magnet is applied
- 119: Divided type circumferential direction permanent magnet 120: Divided type circumferential direction permanent magnet support part
- 121: End support part 131: Circumferential direction permanent magnet applied laminated iron core
- 132: Fixing bridge
- 200: Wire part
- 210: Outer wire 220: Inner wire
- 300: Iron core part
- 310: Outer iron core 320: Inner iron core
- 330: Outer fixing part 340: Inner fixing part
- 400: Stator part 500: Inner and outer air gaps
- 510: Outer air gap 520: Inner air gap
- 531-536: First to sixth air gaps
- 600: Housing part 610: Inner support part
- 700: Bearing
- 701: Rotor and shaft coupling bearing 702: Rotor and inner support part coupling bearing
- 703: Rotator and housing part coupling bearing
- 703-1: Outer circumference-side installed bearing in the rotor and housing part coupling bearing
- 703-2: End installed bearing in the rotor and housing part coupling bearing

703-3: Inner circumference-side installed bearing in the rotor and housing part coupling bearing
703-11: Partial type bearing in the rotor and housing part coupling bearing
703-12: Entire type bearing in the rotor and housing part coupling bearing
704: Inner support part vertical bearing in the vertical shaft
810: Refrigerant passage for cooling the inner wire installed at the center of the inner support part
820: Refrigerant passage nozzle for cooling the inner wire installed at the center of the inner support part
830: Inner wire cooling fan 831: Wing of the inner wire cooling fan
832: Wing support part of the inner wire cooling fan
840: Refrigerant flow hole for cooling the inner wire
850: Outer wire cooling fan 851: Wing support part of the outer wire cooling fan
852: Wing support part of the outer wire cooling fan
860: Refrigerant flow hole for cooling the outer wire
870: Outer wire cooling pipe 880: Inner wire cooling pipe
910: Power conversion device
920: Power conversion device input or output power cable
931~4: First to fourth stator input or output power cables
941~944: Power conversion device and rotary device integrated first to fourth air gaps

What is claimed is:

1. A rotary device comprising a rotor part, a stator part, an inner support part, and a housing part,
    wherein the inner support part is coupled and fixed to the housing part,
    wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core,
    wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part,
    wherein at least one of the pair of end support parts is coupled and fixed to a rotary shaft which is rotatably installed in the housing part,
    wherein the rotor-side magnetic force application part includes:
    a plurality of radial direction permanent magnets, and
    a radial direction permanent magnet side surface support part for supporting the plurality of radial direction permanent magnets,
    wherein the radial direction permanent magnets are arranged so that polarities of the permanent magnets are alternated between a →direction and a ← direction or between a ↑ direction and a ↓, direction along a circumferential direction from a rotation center of the rotor part,
    wherein the radial direction permanent magnet side surface support part is fixed and coupled to the end support part so that radial direction permanent magnets are not scattered when the rotor part rotates, and
    wherein the end support part and the radial direction permanent magnet side surface support part are made of a magnetic material through which a magnetic flux easily passes or a non-magnetic material, the end support part and the radial direction permanent magnet side surface support part has an integrated structure, a groove to which the radial direction permanent magnets are inserted is formed in the integrated structure, and the radial direction permanent magnets are attached to the integrated structure to prevent separation during rotation or inserted and coupled by applying an angle to a portion between the radial direction permanent magnet side surface support part, the end support part, and the radial direction permanent magnet.

2. The rotary device of claim 1, wherein the rotor-side magnetic force application part includes:
    a plurality of radial direction permanent magnets, and
    a radial direction permanent magnet side surface support part for supporting the plurality of radial direction permanent magnets,
    wherein the radial direction permanent magnets are arranged so that polarities of the permanent magnets are alternated between a →direction and a ← direction or between a ↑ direction and a ↓, direction along a circumferential direction from a rotation center of the rotor part, and
    wherein the radial direction permanent magnet side surface support part is fixed and coupled to the end support part so that radial direction permanent magnets are not scattered when the rotor part rotates, and
    wherein the radial direction permanent magnets are divided vertically in the radial direction,
    the divided permanent magnets are arranged such that polarities of the divided permanent magnets are arranged in the same direction (↑, ↑) or different directions (↑, ↓), and
    a radial direction vertical permanent magnet support part having an inner circumferential surface and an outer circumferential surface to which the vertically divided permanent magnets are fixed are additionally provided between the vertically divided permanent magnets.

3. The rotary device of claim 1, wherein the rotor-side magnetic force application part is provided separately from or integrated with the pair of end support parts, and includes:
    a radial direction vertical permanent magnet support part having a cylindrical shape, and
    a plurality of radial direction permanent magnets that are coupled to an inner circumferential surface and an outer circumferential surface of the radial direction vertical permanent magnet support part.

4. The rotary device of claim 1, wherein the rotor-side magnetic force application part includes a plurality of circumferential direction permanent magnets and an iron core for supporting the circumferential direction permanent magnets, and
    the plurality of circumferential direction permanent magnets are arranged so that polarities of the permanent magnets are alternated between the →direction and the ← direction or between the ↑ direction and the ↓, direction along a circumferential direction from the rotation center of the rotor part, and a magnetic flux is concentrated on an air gap surface of the iron core when the circumferential direction permanent magnet is applied.

5. The rotary device of claim 1, wherein the rotor-side magnetic force application part includes:
    a plurality of groove inserted type circumferential direction permanent magnets, a laminated iron core when the groove inserted type circumferential direction permanent magnet is applied, and a rotor part support part when the circumferential direction permanent magnet is applied, which is fixed and coupled to the end support part.

6. The rotary device of claim 1, further comprising an outer wire cooling fan for cooling the outer wire and an inner wire cooling fan for cooling the inner wire.

7. The rotary device of claim 1, wherein the outer iron core is coupled with an outer wire cooling pipe for cooling the outer wire, the inner iron core is coupled with an inner wire cooling pipe for cooling the inner wire, and the outer wire cooling pipe and the inner wire cooling pipe have one structure of a refrigerant circulation structure or a heat pipe structure.

8. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, wherein the rotor-side magnetic force application part includes:

a plurality of circumferential direction permanent magnets, a laminated iron core when the circumferential direction permanent magnet is applied, and a plurality of circumferential direction permanent magnet support parts fixed and coupled to the end support part and installed between the plurality of divided type circumferential direction permanent magnet, and wherein the pair of circumferential direction permanent magnets are arranged in the circumferential direction with each of the circumferential direction permanent magnet support parts therebetween, so that polarities of the permanent magnets in the circumferential direction are alternated between the →→direction and the ←← direction.

9. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, and wherein the rotor-side magnetic force application part includes:

a plurality of groove inserted type circumferential direction permanent magnets, a magnetic laminated iron core for supporting the groove inserted type circumferential direction permanent magnets, and a fixing bridge for fixing the laminated iron core to the end support part.

10. The rotary device of claim 9, wherein the rotor-side magnetic force application part further includes a rotor part support part when the circumferential direction permanent magnet is applied, which is fixed and coupled to the end support part.

11. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, and wherein the laminated iron core formed with a plurality of insertion grooves to which the permanent magnets are inserted on the outer circumferential surface or the inner circumferential surface, or a plurality of insertion holes into which the permanent magnets are inserted in order to prevent the permanent magnet from being exposed to the outer air gap and the inner air gap.

12. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, wherein the rotary device further comprises an outer wire cooling fan for cooling the outer wire and an inner wire cooling fan for cooling the inner wire, and wherein a refrigerant flow hole for cooling the outer wire and a refrigerant flow hole for cooling the inner wire is formed in the housing part, and the inner support part includes a refrigerant passage for cooling the inner wire installed in the shaft direction and a refrigerant passage nozzle for cooling the inner wire, which is connected with the refrigerant passage for cooling the inner wire and injects a refrigerant.

13. The rotary device of claim 12, wherein the outer wire cooling fan and the inner wire cooling fan are installed on one of the inside and the outside of the housing part.

14. The rotary device of claim 12, wherein the refrigerant passage for cooling the inner wire and the refrigerant passage nozzle for cooling the inner wire are formed in the inner support part or separately installed.

15. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, wherein the rotary device further comprises an outer wire cooling fan for cooling the outer wire and an inner wire cooling fan for cooling the inner wire, and wherein the inner wire cooling fan includes a wing support part of the inner wire cooling fan in which a wing of the inner wire cooling fan is installed at the inside thereof.

16. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, wherein the rotary device further comprises an outer wire cooling fan for cooling the outer wire and an inner wire cooling fan for cooling the inner wire, and wherein the outer wire cooling fan includes a wing support part of the outer wire cooling fan in which a wing of the outer wire cooling fan is installed at the outside thereof.

17. A rotary device having one or more pairs of an inner air gap and an outer air gap, the rotary device comprising a rotor part, a stator part, an inner support part, and a housing part, wherein the stator part includes: a central stator part including a stator iron core installed on an inner support part disposed at a central portion and extending in a shaft direction in a circumferential direction and a stator wire wound around the stator iron core; an outer stator part installed at an outermost portion and including a stator iron core and a stator wire wound around the stator iron core; and at least one intermediate stator part including an inner stator iron core and an outer stator iron core, which are respectively installed on an inner circumferential surface and an outer circumferential surface of at least one iron core support part extending in the shaft direction between the central stator part and the outer stator part to form a concentric circle with the outer stator part, and an inner stator wire and an outer stator wire, which are respectively wound around the inner stator iron core and the outer stator iron core, wherein the rotor part includes: a plurality of rotor-side magnetic force application parts installed to have an inner air gap with respect to the inner stator wire installed at the inner circumference side and an outer air gap with respect to the outer stator wire installed at the outer circumference side; and a pair of end support parts installed at respective ends of the rotor-side magnetic force application part, and wherein at least one of the pair of end support parts is fixed and coupled to a rotary shaft rotatably installed to the housing part.

18. The rotary device of claim 17, wherein a stator iron core and a stator wire wound around the stator iron core are installed on an outer circumferential surface of the outer stator part in a circumferential direction, and the rotor part includes an outer rotary part rotatably installed and spaced apart from the stator wire installed on the outer circumferential surface of the outer stator part with an inner air gap therebetween and forming an outer circumference of the rotary device and a plurality of magnetic force application parts to which the outer rotary part is fixedly installed on an inner circumferential surface thereof in the circumferential direction.

19. A rotary device comprising a rotor part, a stator part, an inner support part, and a housing part, wherein the inner support part is coupled and fixed to the housing part, wherein the stator part includes an inner stator part which includes an inner iron core coupled and fixed to the inner support part, and an inner wire wound on the inner iron core; and an outer stator part which includes an outer iron core coupled and fixed to the inner circumferential surface of the housing part, and an outer wire wound on the outer iron core, wherein the rotor part includes a rotor-side magnetic force application part which has an inner air gap between the inner circumferential side thereof and the inner stator part and an outer air gap between the outer circumferential side thereof and the outer stator part; and a pair of end support parts installed at respective ends of the rotor-side magnetic force application part, wherein at least one of the pair of end support parts is coupled and fixed to a rotary shaft which is rotatably installed in the housing part, and wherein a power conversion device for supplying a power to a wire of the stator part is installed at a center of the innermost stator part based on a radial direction of the rotary shaft, and the power conversion device supplies the power to the wire of the stator part according to a preset control algorithm.

20. The rotary device of claim 19, wherein the power conversion device for receiving a power induced from the wire of the stator part is installed at the center of the innermost stator part based on the radial direction of the rotary shaft.

\* \* \* \* \*